(12) United States Patent
Seal et al.

(10) Patent No.: US 6,907,515 B2
(45) Date of Patent: Jun. 14, 2005

(54) CONFIGURATION CONTROL WITHIN DATA PROCESSING SYSTEMS

(75) Inventors: David James Seal, Cambridge (GB); Christopher Bentley Dornan, Cambridge (GB)

(73) Assignee: Arm Limited, Cambridge (GB)

(*) Notice: Subject to any disclaimer, the term of this patent is extended or adjusted under 35 U.S.C. 154(b) by 487 days.

(21) Appl. No.: 10/152,337

(22) Filed: May 22, 2002

(65) Prior Publication Data

US 2002/0199087 A1 Dec. 26, 2002

(30) Foreign Application Priority Data

May 31, 2001 (GB) ............................................. 0113196

(51) Int. Cl.[7] ................................................. G06F 9/00
(52) U.S. Cl. ...................................................... 712/209
(58) Field of Search ........................................ 712/209

(56) References Cited

U.S. PATENT DOCUMENTS

| | | | |
|---|---|---|---|
| 3,889,243 A | 6/1975 | Drimak ...................... | 711/132 |
| 4,236,204 A | 11/1980 | Groves ....................... | 712/204 |
| 4,587,632 A | 5/1986 | Ditzel ......................... | 711/213 |
| 4,779,188 A | * 10/1988 | Gum et al. ..................... | 718/1 |
| 4,888,771 A | * 12/1989 | Benignus et al. ............. | 714/26 |
| 4,922,414 A | 5/1990 | Holloway ................... | 711/207 |
| 4,969,091 A | 11/1990 | Muller ....................... | 712/228 |
| 5,101,346 A | * 3/1992 | Ohtsuki ...................... | 718/100 |
| 5,136,696 A | 8/1992 | Beckwith ................... | 712/240 |
| 5,455,775 A | 10/1995 | Huber ......................... | 716/17 |
| 5,619,665 A | 4/1997 | Emma ......................... | 712/208 |
| 5,638,525 A | 6/1997 | Hammond .................. | 712/209 |
| 5,659,703 A | 8/1997 | Moore ....................... | 711/109 |
| 5,740,461 A | 4/1998 | Jaggar ....................... | 712/209 |
| 5,742,802 A | 4/1998 | Harter ....................... | 712/227 |
| 5,752,035 A | 5/1998 | Trimberger ................ | 712/229 |

(Continued)

FOREIGN PATENT DOCUMENTS

| | | |
|---|---|---|
| GB | 2 307 072 A | 5/1997 |
| GB | 2 365 584 A | 2/2002 |
| WO | 00/39670 | 7/2000 |

OTHER PUBLICATIONS

Y. Patt, *Introduction to Computer Systems From Bits and Gates to C and Beyond*, 1999, pp. 1–517.

M. Ertl, "Stack Caching for Interpreters" 1994, pp. 1–13.

M. Ertl, "Stack Caching for Interpreters" 1995, pp. 1–13.

M. Ertl, "Implementation of Stack–Based Languages on Register Machines" Apr. 1996, pp. 1–4.

J. O'Connor et al, "PicoJava–I: The Java Virtual Machine in Hardware" *IEEE Micro* A Case for Intelligent RAM, Mar./Apr. 1997, pp. 45–53.

(Continued)

*Primary Examiner*—Eric Coleman
(74) *Attorney, Agent, or Firm*—Nixon & Vanderhye P.C.

(57) ABSTRACT

A data processing system is provided with a first mechanism for executing instructions of a first instruction set and a second mechanism for executing instructions of a second instruction set. The second mechanism requires configuration data 310, 312, 314, 316 which may or may not be valid. Programs that use the second execution mechanism are responsible for the writing of its own configuration data with this being indicated as being necessary by a configuration valid indicator CV set to indicate that the configuration is invalid by the operating system 300 upon detecting an appropriate process switch.

42 Claims, 21 Drawing Sheets

U.S. PATENT DOCUMENTS

| | | | |
|---|---|---|---|
| 5,784,584 A | 7/1998 | Moore | 712/200 |
| 5,809,336 A | 9/1998 | Moore | 710/25 |
| 5,813,039 A * | 9/1998 | Wakui | 711/156 |
| 5,838,948 A | 11/1998 | Bunza | 703/27 |
| 5,875,336 A | 2/1999 | Dickol | 717/143 |
| 5,892,966 A | 4/1999 | Petrick | 712/36 |
| 5,924,127 A * | 7/1999 | Kawamoto et al. | 711/207 |
| 5,925,123 A | 7/1999 | Tremblay | 712/23 |
| 5,926,832 A | 7/1999 | Wing | 711/141 |
| 5,937,193 A | 8/1999 | Evoy | 717/140 |
| 5,953,741 A | 9/1999 | Evoy | 711/132 |
| 6,003,126 A | 12/1999 | Huynh | 712/217 |
| 6,009,499 A | 12/1999 | Koppala | 711/132 |
| 6,009,509 A | 12/1999 | Leung | 712/202 |
| 6,014,723 A | 1/2000 | Tremblay | 711/1 |
| 6,021,469 A | 2/2000 | Tremblay | 711/125 |
| 6,026,485 A | 2/2000 | O'Connor | 712/226 |
| 6,031,992 A | 2/2000 | Cmelik | 717/138 |
| 6,038,643 A | 3/2000 | Tremblay | 711/132 |
| 6,070,173 A | 5/2000 | Huber | 707/206 |
| 6,088,786 A | 7/2000 | Feierbach | 712/200 |
| 6,122,638 A | 9/2000 | Huber | 707/103 Y |
| 6,125,439 A | 9/2000 | Tremblay | 712/202 |
| 6,148,391 A | 11/2000 | Petrick | 712/202 |
| 6,298,434 B1 | 10/2001 | Lindwer | 712/209 |
| 6,317,872 B1 | 11/2001 | Gee | 717/152 |
| 6,338,134 B1 | 1/2002 | Leung | 712/217 |
| 6,349,377 B1 | 2/2002 | Lindwer | 712/22 |
| 6,374,286 B1 | 4/2002 | Gee | 718/108 |
| 6,442,753 B1 * | 8/2002 | Gerard et al. | 717/170 |
| 6,606,743 B1 | 8/2003 | Raz | 717/148 |

OTHER PUBLICATIONS

K. Andrews et al, "Migrating a CISC Computer Family Onto RISC Via Object Code Translation" 1992, pp. 213–222.

"PicoJava I Microprocessor Core Architecture" Oct. 1996, pp. 1–8, Sun Microsystems.

M. Ertl, "A New Approach to Forth Native Code Generation" 1992.

M. Maierhofer et al, "Optimizing Stack Code" 1997, p. 19.

D. Ungar et al, "Architecture of SOAR: Smalltalk on a RISC" The 11$^{th}$ Annual International Symposium on Computer Architecture, Jun. 1984, pp. 188–197.

O. Steinbusch, "Designing Hardware to Interpret Virtual Machine Instructions" Feb. 1998, pp. 1–59.

R. Kapoor et al, "Stack Renaming of the Java Virtual Machine" Dec. 1996, pp. 1–17.

A. Yonezawa et al, "Implementing Concurrent Object–Oriented Languages in Multicomputers" *Parallel Distributed Technology* (*Systems and Applications*) May 1993, pp. 49–61.

C. Hsieh et al, "Java Bytecode to Native Code Translation; The Caffeine Prototype and Preliminary Results" IEEE/ACM International Symposium on Microarchitecture, Dec. 1996, pp. 90–97.

Y. Patt et al, *Introduction to Computer Systems From Bits and Gates to C and Beyond*, 2001, pp. 1–526.

Sun Microsystems PicoJava Processor Core Data Sheet, Dec. 1997, pp. 1–6.

H. McGhan et al, PicoJava A Direct Execution Engine for Java Bytecode, Oct. 1998, pp. 22–26.

C. Glossner et al, "Parallel Processing" Euro–Par 1997: Passau, Germany, Aug. 1997.

Y. Patt, *Introduction to Computer Systems From Bits and Gates to C and Beyond*, 1999, pp. 10–12 & 79–82.

Espresso—The High Performance Java Core Specification, Oct. 2001, pp. 1–33, Aurora VLSI, Inc.

J. Gosling, "Java Intermediate Bytecodes" 1995, pp. 111–118.

P. Koopman, Jr. "Stack Computers The New Wave" 1989, pp. 1–234.

M. Mrva et al., "A Scalable Architecture for Multi–Threaded JAVA Applications" Design Automation and Test in Europe, Feb. 1998, pp. 868–874.

L. Chang et al, "Stack Operations Folding in Java Processors" *IEEE Proc.—Comput. Digit. Tech.*, vol. 145, No. 5, pp. 333–340 Sep. 1998.

L. Ton et al, Proceedings of the '97 International Conference on Parallel and Distributed Systems, "Instruction Folding in Java Processor", pp. 138–143, Dec. 1997.

K. Buchenrieder et al, "Scalable Processor Architecture for Java With Explicit Thread Support" *Electronics Letters* vol. 33, No. 18, pp. 1532+, Aug. 1997.

C. Chung et al, Proceedings of the '98 International Conference on Parallel and Distributed Systems, "A Dual Threaded Java Processor for Java Multithreading" pp. 693–700, Dec. 1998.

I. Kazi et al, "Techniques for Obtaining High Performance in Java Programs" Sep. 2000, pp. 213–240.

R. Kieburtz, "A RISC Architecture for Symbolic Computation" 1987, pp. 146–155.

M. Berekovic et al, "Hardware Realization of a Java Virtual Machine for High Performance Multimedia Applications" *Signal Processing Systems SIPS 98*, pp. 479–488, 1997.

P. Deutsch, "Efficient Implementation of the Smalltalk–80 System" 1983, pp. 297–302.

"Rockwell Produces Java Chip" Sep. 1997, CNET News.com.

Y. Patt et al, *Introduction to Computing Systems from Bits and Gates to C and Beyond*, 2001, pp. 1–16, 91–118 & 195–209.

* cited by examiner do_iadd

LDRB    R4, [R14, #1]!         —— Load next Java bytecode and update bytecode pointer
LDR     R1, [Rstack, #-4]!     —— POP first operand from stack
LDR     R0, [Rstack, #-4]!     —— POP second operand from stack
LDR     R12, [Rexc, R4, LSL #2] —— Get address of code fragment for next bytecode
ADD     R0, R0, R1             —— Perform integer add
STR     R0, [Rstack], #4       —— PUSH result to stack
BXJ     R12                    —— Do next bytecode in hardware/software

| Bytecode | Operation |
|---|---|
| 0 | Fixed 0 |
| 1 | Fixed 1 |
| ⋮ | ⋮ |
| 201 | Fixed 201 |
| 202 | Fixed 202 |
| | |
| 254 | Fixed 254 |
| 255 | Fixed 255 |

Fixed bindings: 0–202
Programable bindings: (hatched region)
Fixed bindings: 254–255

FIG. 7

(PA (Half1) = False) AND (PA (Half2) = True)

AND ( ((Number of operands = 1) AND (bcadd [1:0] = 11))
OR ((Number of operands = 2) AND (bcadd [1] = 1)))

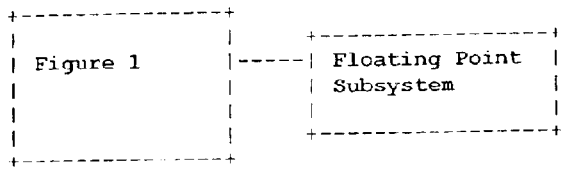

FIG. 21

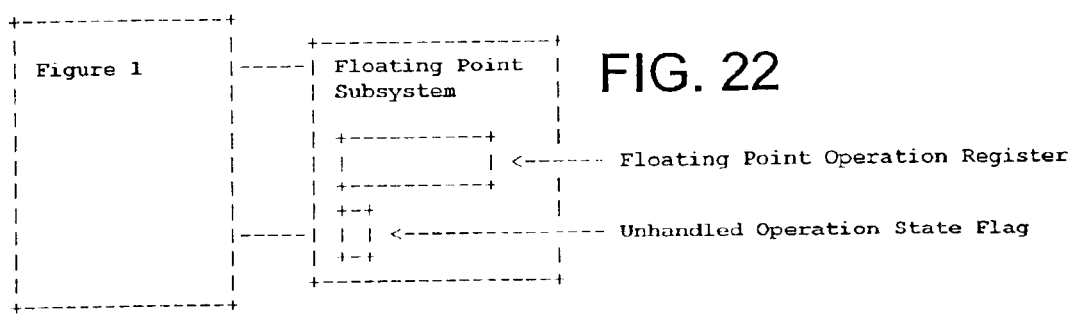

FIG. 22

```
+------------------------------------+-----------------------------------+
| Single precision                   | Double precision                  |
+------------------------------------+-----------------------------------+
| fadd  | FADDS  Sd, Sn, Sm          | dadd  | FADDD  Dd, Dn, Dm         |
| fsub  | FSUBS  Sd, Sn, Sm          | dsub  | FSUBD  Dd, Dn, Dm         |
| fmul  | FMULS  Sd, Sn, Sm          | dmul  | FMULD  Dd, Dn, Dm         |
| fdiv  | FDIVS  Sd, Sn, Sm          | ddiv  | FDIVD  Dd, Dn, Dm         |
| frem  | Not implemented in HW      | drem  | Not implemented in HW     |
| fneg  | FNEGS  Sd, Sm              | dneg  | FNEGD  Dd, Dm             |
| f2d   | FCVTDS Dd, Sm              | d2f   | FCVTSD Sd, Dm             |
| f2i   | FTOSIZS Sd, Sm             | d2i   | FTOSIZD Sd, Dm            |
| f2l   | Not implemented in HW      | d2l   | Not implemented in HW     |
| i2f   | FSITOS Sd, Sm              | i2d   | FSITOD Dd, Sm             |
| l2f   | Not implemented in HW      | l2d   | Not implemented in HW     |
| fcmpl | FCMPS/FMSTAT               | dcmpl | FCMPD/FMSTAT              |
| fcmpg | FCMPS/FMSTAT               | dcmpg | FCMPD/FMSTAT              |
+------------------------------------+-----------------------------------+
```

FIG. 23

```
dmul
        FMULD   D1, D2, D1
dcmpg
        FCMPD   D0, D1
        FMSTAT
        MVNMI   R0, #0
        MOVEQ   R0, #0
        MOVGT   R0, #1
<next Java bytecode>
```

FIG. 24

```
FMULD    D1, D2, D1              ; Causes unhandled operation
FCMPD    D0, D1                  ; Unhandled operation signalled here
  |
  +---------------------+
         To ARM state to         |          ; unhandled operation handler executes
         emulate byte code       |          ; VFP read status instruction to
                    FMRX Rd, FPSCR          ; trigger VFP exception handling
                                 |          ; if unhandled operation state flag
                                 |          ; is set
                    +------------------------+
         Unhandled operation state flag is  |
         set so perform VFP exception handling |
                                            |
                        <Read Floating Point Operation Register>
                        <Emulate FMULD tos-1, tos, tos-1 in SW>
                        <Clear Unhandled Operation State Flag>
                                            |
  +--------------------+
  | Return to unhandled operation handler
  <Re-attempt execution of FMRX Rd, FPSCR instruction,
  without triggering VFP exception handling this time>

<Flush Java stack to memory>

LDRB     R4, [R14]               ; Load bytecode which triggered
                                          ; unhandled operation
         LDR      R12, [Rexc, R4, LSL #2] ; Get address of code fragment
                                          ; to emulate 'dcmpg' instruction
         BX       R12                     ; Branch to code fragment.
                  |                       ; Note use of BX rather than
                  |                       ; BXJ because we do not want
                  |                       ; this to be executed in HW
                  v
         Branch to dcmpg emulation code
                  |
                  v
         LDRB     R4, [R14, #1]!          ; Load next Java bytecode
                                          ; and update bytecode pointer
         FLDD     D1, [Rstack, #-8]!      ; Pop first operand from stack
                                          ; 1 Double = 2 stack words
         FLDD     D0, [Rstack, #-8]!      ; Pop second operand from stack
                                          ; 1 Double = 2 stack words
         LDR      R12, [Rexc, R4, LSL #2] ; Get address of code fragment
                                          ; for next bytecode
         FCMPD    D0, D1                  ; Compare the 2 doubles
         FMSTAT                           ; Read result of compare
         MVNMI    R0, #0                  ; Result = -1 if <
         MOVEQ    R0, #0                  ; Result = 0 if =
         MOVGT    R0, #1                  ; Result = 1 if >
         STR      R0, [Rstack], #4        ; Push result to stack
         BXJ      R12                     ; Do next bytecode in
                                          ; hardware/software
```

FIG. 25

```
FMULD    D1, D2, D1           ; Executes as normal
FCMPD    D0, D1               ; Causes unhandled operation
FMSTAT                        ; Unhandled operation signalled here
   |
   +------------------+
   To ARM state to    |       ; unhandled operation handler executes
   emulate byte code  |       ; VFP read status instruction to
               FMRX Rd, FPSCR ; trigger VFP exception handling
                      |       ; if unhandled operation state flag
                      |       ; is set
                      +-------------------------+
         Unhandled operation state flag is      |
         set so perform VFP exception handling  |
                                                |
                         <Read Floating Point Operation Register>
                         <Emulate FCMPD tos-1, tos>
                         <Clear Unhandled Operation State Flag>
                                                |
                      +-------------------------+
                      | Return to unhandled operation handler
           <Re-attempt execution of FMRX Rd, FPSCR instruction,
           without triggering VFP exception this time>

<Flush Java stack to memory>

LDRB    R4, [R14]              ; Load bytecode which triggered
                                          ; unhandled operation
           LDR     R12, [Rexc, R4, LSL #2] ; Get address of code fragment
                                          ; to emulate 'dcmpg' instruction
           BX      R12                    ; Branch to code fragment.
                   |                      ; Note use of BX rather than
                   |                      ; BXJ because we do not want
                   |                      ; this to be executed in HW
                   V
           Branch to dcmpg emulation code
                   |
                   V
           LDRB    R4, [R14, #1]!         ; Load next Java bytecode
                                          ; and update bytecode pointer
           FLDD    D1, [Rstack, #-8]!     ; Pop first operand from stack
                                          ; 1 Double = 2 stack words
           FLDD    D0, [Rstack, #-8]!     ; Pop second operand from stack
                                          ; 1 Double = 2 stack words
           LDR     R12, [Rexc, R4, LSL #2] ; Get address of code fragment
                                          ; for next bytecode
           FMULD   D0, D0, D1             ; Retry the multiply, This will
                                          ; encounter the same problem as
                                          ; before, detected precisely,
                                          ; but executing ARM instructions
                                          ; rather than bytecodes. The VFP
                                          ; exception handler can handle
                                          ; this without problems
           FSTD    D0, [Rstack], #8       ; Push result, 2 words
           BXJ     R12                    ; Do next bytecode (dcmpg) in
                                          ; hardware/software
```

FIG. 27

```
FMULD   D1, D2, D1
FCMPD   D0, D1                        ; Causes and signals unhandled operation
        |
        +--------------------------+
   To ARM state to                 |   ; unhandled operation handler executes
   emulate byte code               |   ; VFP read status instruction to
                         FMRX Rd, FPSCR ; trigger VFP exception handling
                                   |   ; if unhandled operation state flag
                                   |   ; is set. Since with precise unhandled
                                   |   ; operation detectection there is no
                                   |   ; unhandled operation state flag the
                                   |   ; VFP exception handling will never
                                   |   ; be triggered
   <Flush Java stack to memory>

LDRB    R4, [R14]              ; Load bytecode which triggered
                                       ; unhandled operation
        LDR     R12, [Rexc, R4, LSL #2] ; Get address of code fragment
                                       ; to emulate 'dcmpg' instruction
        BX      R12                    ; Branch to code fragment.
                |                      ; Note use of BX rather than
                |                      ; BXJ because we do not want
                |                      ; this to be executed in HW
                V
   Branch to dcmpg emulation code
                |
                V
        LDRB    R4, [R14, #1]!         ; Load next Java bytecode
                                       ; and update bytecode pointer
        FLDD    D1, [Rstack, #-8]!     ; Pop first operand from stack
                                       ; 1 Double = 2 stack words
        FLDD    D0, [Rstack, #-8]!     ; Pop second operand from stack
                                       ; 1 Double = 2 stack words
        LDR     R12, [Rexc, R4, LSL #2] ; Get address of code fragment
                                       ; for next bytecode
        FCMPD   D0, D1                 ; Retry the comparison. This will
                                       ; encounter the same problem as
                                       ; before, detected precisely,
                                       ; but executing ARM instructions
                                       ; rather than bytecodes. The VFP
                                       ; exception handler can handle
                                       ; this without problems
        FMSTAT                         ; Read result of compare
        MVNMI   R0, #0                 ; Result = -1 if <
        MOVEQ   R0, #0                 ; Result = 0 if =
        MOVGT   R0, #1                 ; Result = 1 if >
        STR     R0, [Rstack], #4       ; Push result to stack
        BXJ     R12                    ; Do next bytecode in
                                       ; hardware/software
```

FIG. 30

CONFIGURATION CONTROL WITHIN DATA PROCESSING SYSTEMS

BACKGROUND OF THE INVENTION

1. Field of the Invention

This invention relates to the field of data processing systems. More particularly, this invention relates to data processing systems having multiple instruction sets and configuration data associated with the mechanism for executing one of the instruction sets.

2. Description of the Prior Art

It is known to provide data processing systems, such as Thumb enabled processors produced by ARM Limited of Cambridge, England, which support multiple instruction sets.

A further type of data processing system that supports multiple instruction sets is one that has a processor having a native instruction set and a Java acceleration mechanism seeking to execute Java bytecodes. A complication that arises with such systems is that the Java Virtual Machines that operate in conjunction with such Java acceleration mechanisms can vary considerably and require significant differences in the way in which the Java acceleration mechanisms are configured. This factor when combined with a situation in which a single system may be using multiple Java Virtual Machines operating in different processes has the result that the operating system needs to control the configuration of the Java acceleration mechanism to suit whichever particular Java Virtual Machine is executing at a particular point in time. In order to deal with this, existing operating systems require modification to handle this management function. Furthermore, there is a wide variation in the amount of configuration data that is needed for different Java acceleration mechanisms and so it is difficult to efficiently provide operating system mechanisms for managing this configuration data.

SUMMARY OF THE INVENTION

Viewed from one aspect the present invention provides an apparatus for processing data, said apparatus comprising:

(i) a first execution mechanism operable to execute program instructions of a first instruction set; and (ii) a second execution mechanism operable to execute program instructions of a second instruction set, said second execution mechanism having variable configuration data associated therewith and a configuration valid indicator for indicating whether said variable configuration data associated with said second execution mechanism is valid;

(iii) wherein a configuration invalid exception handler triggered by said second execution mechanism when said second execution mechanism attempts execution of a program instruction of said second instruction set whilst said configuration valid indicator indicates that said configuration data is invalid acts to change said configuration valid indicator to indicate that said configuration data is valid and to set said configuration data to a valid form.

The invention recognises that processes using the second execution mechanism can be made responsible for configuring it according to their needs with the operating system signalling a requirement for a process to restore its configuration by clearing a configuration valid indicator. This considerably simplifies the task that needs to be performed by the operating system since it need now only be responsible for controlling the configuration valid indicator rather than all the configuration data. Furthermore, devolving this control of configuration to the second execution mechanism itself can be done without fatally compromising the integrity of the system as a whole since an incorrect configuration of the second execution mechanism will not have consequences for correctly designated processes other than those that use the second execution mechanism. Providing configuration of the second execution mechanism by way of a configuration invalid exception handler enables this management task to be conveniently accommodated within the overall system structures.

The invention is particularly well suited to embodiments in which an operating system executing upon the first execution mechanism, in response to a change of process to a new process in at least those cases where said new process uses said second execution mechanism and is not a last process to have completely written its configuration data to said second execution mechanism, acts to set the configuration valid indicator to indicate that the configuration data is invalid. It is a relatively light task for an operating system to react to a process change in this way and yet this mechanism is able to reliably deal with required configuration changes. It will be appreciated that there are multiple methods to achieve this, ranging from doing so for just these cases to doing so for all process swaps, and that these different methods involve different engineering trade-offs between the complexity of detecting such process swaps and performance lost due to unnecessary invocations of configuration invalid exception handlers.

The changing of the configuration valid indicator to indicate that the configuration is valid could be achieved in a variety of ways. It would be possible for this flag to be set by a program instruction, but it is more reliable if this function is performed by hardware within the second execution mechanism. Furthermore, if this flag is set by hardware within the second execution mechanism, then only the operating system needs to access the flag with program instructions. The program instructions that access this flag can then be made supervisor-only, resulting in increased protection against untrusted user mode processes.

It will be appreciated that since the second execution mechanism will be likely to be substantially inoperative until its configuration data is properly set, the configuration invalid exception handler may conveniently use program instructions of the first instruction set executing on the first instruction mechanism to set the configuration data for the second execution mechanism.

Whilst it is applicable to a wide variety of environments, the invention is particularly well suited to systems in which the first execution mechanism includes a processor core with the first instruction set being native instructions of that processor core. The second execution mechanism may include a Java bytecode interpreter with the second instruction set being Java bytecodes and the second execution mechanism including both the Java bytecode interpreter and the processor core. In this context, as well as more generally, preferred embodiments are ones in which the configuration data relates to a particular Java Virtual Machine using the second execution mechanism, such as bytecode mapping data for mapping Java bytecodes to processing operations.

It is preferred that the configuration valid indicator is set to indicate that the configuration data is invalid when the apparatus is reset in order to force correct initialisation and setting of the configuration data upon first use of the second execution mechanism.

Java acceleration systems, and other systems having more than one execution mechanism, are likely to contain handlers for bytecodes that are too complex to handle in hardware and/or handlers for Java exceptions encountered during execution of the bytecodes, and it is advantageous to use a common mechanism for the configuration invalid exception handler and these other handlers.

Viewed from another aspect the present invention provides a method of processing data, said method comprising the steps of:

(i) executing program instructions of a first instruction set using a first execution mechanism;

(ii) executing program instructions of a second instruction set using a second execution mechanism, said second execution mechanism having variable configuration data associated therewith and a configuration valid indicator for indicating whether said variable configuration data associated with said second execution mechanism is valid;

(iii) wherein when said second execution mechanism attempts execution of a program instruction of said second instruction set whilst said configuration valid indicator indicates that said configuration data is invalid, a configuration invalid exception handler triggered by said second execution mechanism acts to change said configuration valid indicator to indicate that said configuration data is valid and to set said configuration data to a valid form.

Viewed from a further aspect the present invention provides a computer program product for controlling a data processing apparatus having a first execution mechanism operable to execute program instructions of a first instruction set and a second execution mechanism operable to execute program instructions of a second instruction set, said second execution mechanism having variable configuration data associated therewith and a configuration valid indicator for indicating whether said variable configuration data associated with said second execution mechanism is valid, said computer program product comprising:

(i) a configuration invalid exception handler triggered by said second execution mechanism when said second execution mechanism attempts execution of a program instruction of said second instruction set whilst said configuration valid indicator indicates that said configuration data is invalid to change said configuration valid indicator to indicate that said configuration data is valid and to set said configuration data to a valid form.

As well as providing an apparatus and a method, the present invention may be expressed in the form of a computer program product being support code for use with such an apparatus or method. Such support code may be distributed on a recordable media, embedded as firmware within an embedded processing system or distributed in another way.

The above, and other objects, features and advantages of this invention will be apparent from the following detailed description of illustrative embodiments which is to be read in connection with the accompanying drawings.

BRIEF DESCRIPTION OF THE DRAWINGS

FIG. 7 illustrates the mapping between Java bytecodes and processing operations;

FIG. 21 illustrates a data processing system incorporating bytecode translation hardware as in FIG. 1, further incorporating a floating point subsystem;

FIG. 22 illustrates a data processing system incorporating bytecode translation hardware as in FIG. 1 and a floating point subsystem as in FIG. 21, further incorporating a floating point operation register and an unhandled operation state flag;

FIG. 23 shows the ARM floating point instructions generated for Java floating point instructions;

FIG. 24 shows a sequence of ARM instructions that might be generated by the Java acceleration hardware for the Java 'dmul' and 'dcmpg' instructions;

FIG. 25 shows the sequence of operations when executing a 'dmul' instruction followed by a 'dcmpg' instruction where an unhandled floating point operation is caused by execution of the FCMPD instruction generated by the Java acceleration hardware for the Java 'dmul' instruction, the sequence of operations shown is for a system using imprecise unhandled operation detection corresponding to FIG. 22;

FIG. 27 shows the sequence of operations when executing a 'dmul' instruction followed by a 'dcmpg' instruction where an unhandled floating point operation is caused by execution of the FCMPD instruction generated by the Java acceleration hardware for the Java 'dcmpg' instruction, the sequence of operations shown is for a system using imprecise unhandled operation detection corresponding to FIG. 22;

FIG. 30 shows the sequence of operations when executing a 'dmul' instruction followed by a 'dcmpg' instruction where an unhandled floating point operation is caused by execution of the FCMPD instruction generated by the Java acceleration hardware for the Java 'dcmpg' instruction, the sequence of operations shown is for a system using precise unhandled operation detection corresponding to FIG. 21.

DESCRIPTION OF THE PREFERRED EMBODIMENTS

Figure 1:
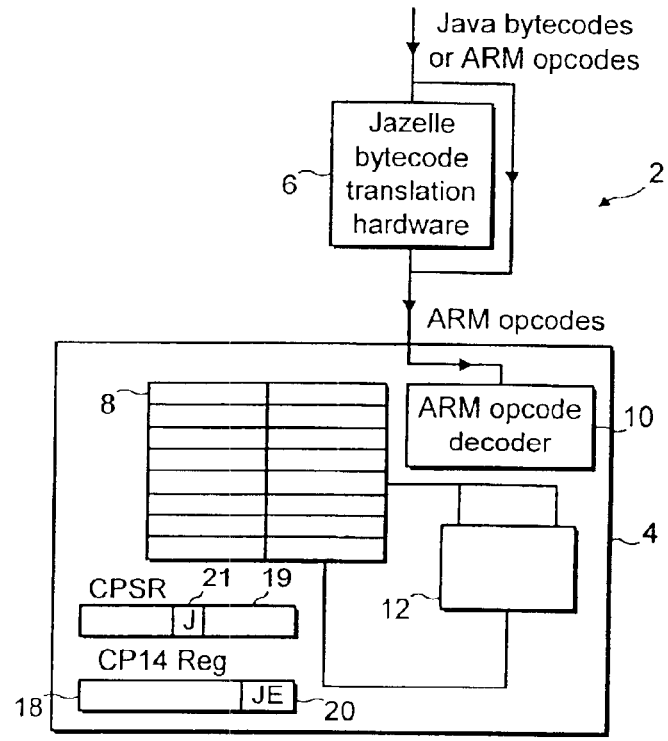
FIG. 1 illustrates a data processing system incorporating bytecode translation hardware.

FIG. 1 illustrates a data processing system 2 that incorporates a processor core 4, such as an ARM processor, and bytecode translation hardware 6 (also called Jazelle). The processor core 4 includes a register bank 8, an instruction decoder 10 and a datapath 12 for performing various data processing operations upon data values stored within the registers of the register bank 8. A register 18 is provided which includes a flag 20 which controls whether the bytecode translation hardware 6 is currently enabled or disabled. In addition, a register 19 is provided which includes a flag 21 which indicates whether the bytecode translation hardware is currently active or inactive. In other words flag 21 indicates whether the data processing system is currently execute Java bytecodes or ARM instructions. It will be appreciated that in other embodiments the registers 18 and 19 could be a single register containing both the flags 20 and 21.

In operation, if Java bytecodes are being executed and the bytecode translation hardware 6 is active, then Java bytecodes are received by the bytecode translation hardware 6 and serve to generate a sequence of corresponding ARM instructions (in this particular non-limiting example embodiment), or at least processor core controlling signals representing ARM instructions, that are then passed to the processor core 4. Thus, the bytecode translation hardware 6 may map a simple Java bytecode to a sequence of corresponding ARM instructions that may be executed by the processor core 4. When the bytecode translation hardware is inactive, it will be bypassed and normal ARM instructions can be supplied to the ARM instruction decoder 10 to control the processor core 4 in accordance with its native instruction set. It will be appreciated throughout that the sequences of ARM instructions could equally be sequences of Thumb instructions and/or mixtures of instruction from different instruction sets and such alternatives are envisaged and encompassed.

It will be appreciated that the bytecode translation hardware 6 may only provide hardware translation support for a subset of the possible Java bytecodes that may be encountered. Certain Java bytecodes may require such extensive and abstract processing that it would not be efficient to try and map these in hardware to corresponding ARM instruction operations. Accordingly, when the bytecode translation hardware 6 encounters such a non-hardware supported bytecode, it will trigger a software instruction interpreter written in ARM native instructions to perform the processing specified by that non-hardware supported Java bytecode.

The software instruction interpreter may be written to provide software support for all of the possible Java bytecodes that may be interpreted. If the bytecode translation hardware 6 is present and enabled, then only those Java bytecodes that are non-hardware supported will normally be referred out to the relevant code fragments within the software instruction interpreter. However, should bytecode translation hardware 6 not be provided, or be disabled (such as during debugging or the like), then all of the Java bytecodes will be referred to the software instruction interpreter.

Figure 2:
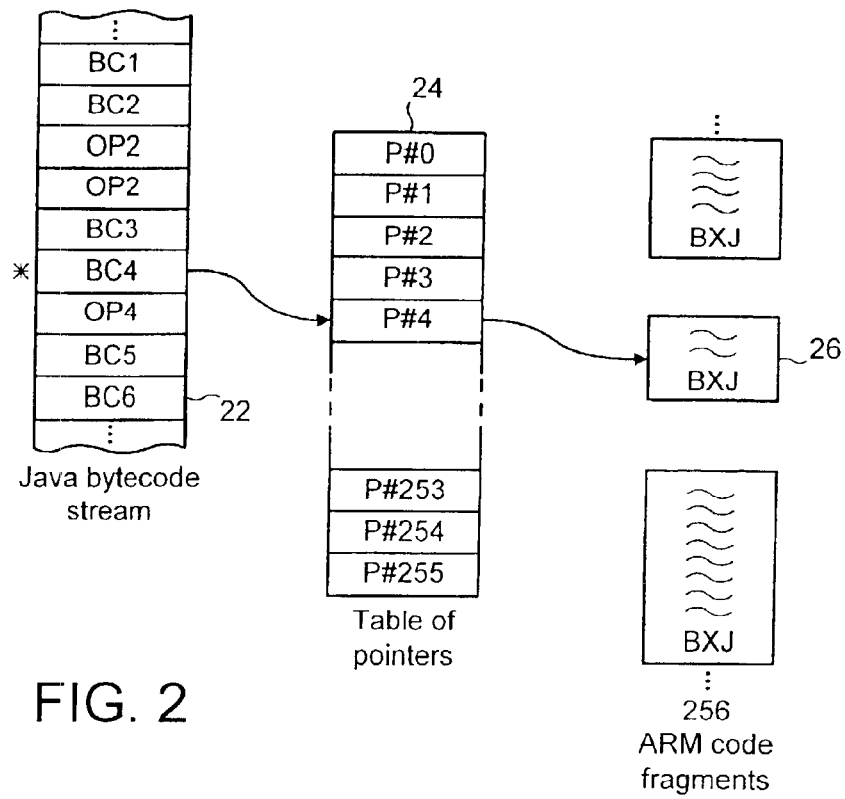
FIG. 2 schematically illustrates software instruction interpretation of bytecodes.

FIG. 2 schematically illustrates the action of the software instruction interpreter. A stream of Java bytecodes 22 represents a Java program. These Java bytecodes may be interspersed with operands. Thus, following execution of a given Java bytecode, the next Java bytecode to be executed may appear in the immediately following byte position, or may be several byte positions later if intervening operand bytes are present.

As shown in FIG. 2, a Java bytecode BC4 is encountered which is not supported by the bytecode translation hardware 6. This triggers an exception within the bytecode translation hardware 6 that causes a look up to be performed within a table of pointers 24 using the bytecode value BC4 as an index to read a pointer P#4 to a code fragment 26 that will perform the processing specified by the non-hardware supported bytecode BC4. A base address value of the table of pointers may also be stored in a register. The selected code fragment is then entered with R14 pointing to the unsupported bytecode BC4.

As illustrated, as there are 256 possible bytecode values, the table of pointers 24 contains 256 pointers. Similarly, up to 256 ARM native instruction code fragments are provided to perform the processing specified by all the possible Java bytecodes. (There can be less than 256 in cases where two bytecodes can use the same code fragment). The bytecode translation hardware 6 will typically provide hardware support for many of the simple Java bytecodes in order to increase processing speed, and in this case the corresponding code fragments within the software instruction interpreter will never be used except if forced, such as during debug or in other circumstances such as prefetch aborts as will be discussed later. However, since these will typically be the simpler and shorter code fragments, there is relatively little additional memory overhead incurred by providing them. Furthermore, this small additional memory overhead is more than compensated by the then generic nature of the software instruction interpreter and its ability to cope with all possible Java bytecodes in circumstances where the bytecode translation hardware is not present or is disabled.

Figure 3:
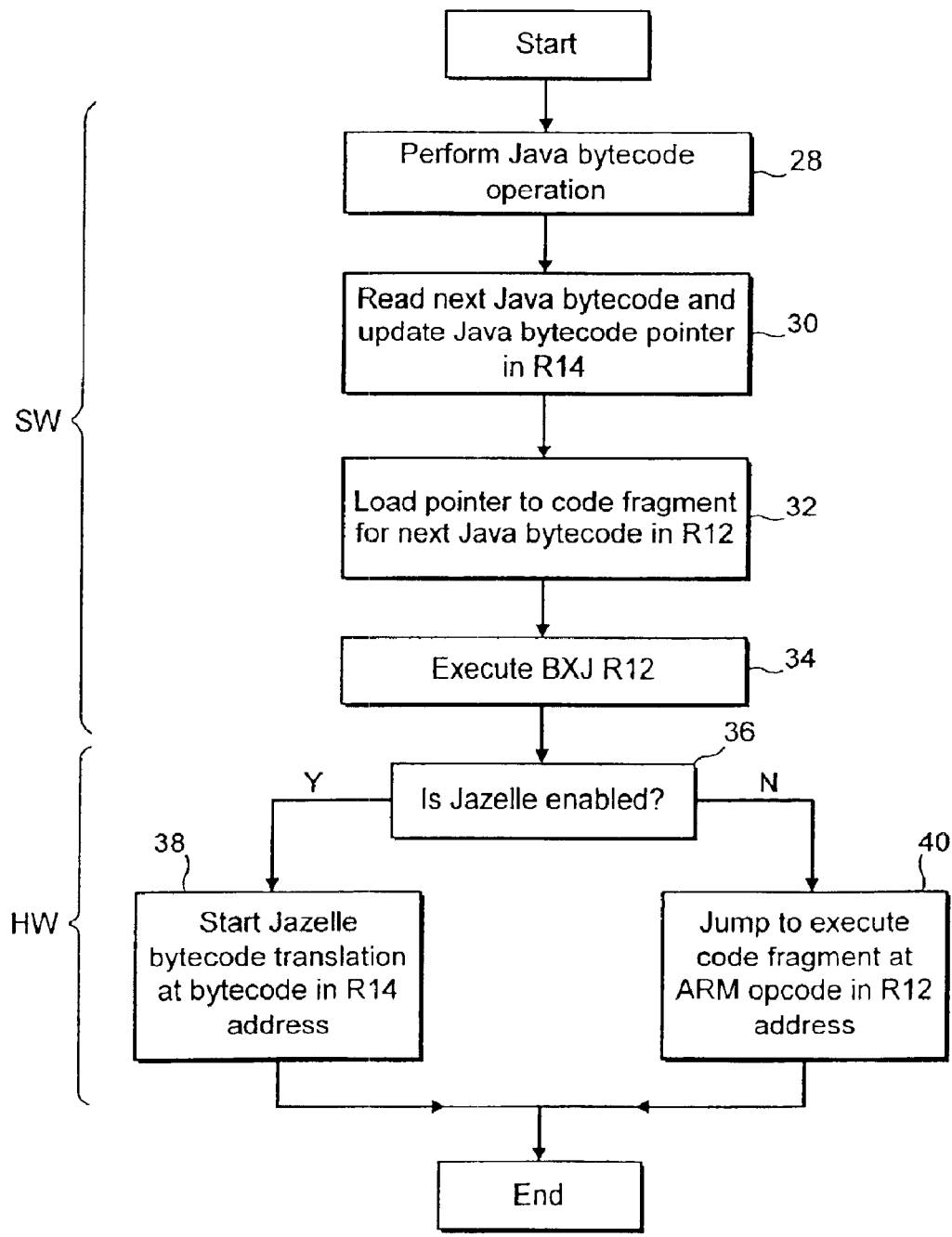
FIG. 3 is a flow diagram schematically representing the operation of a code fragment within the software instruction interpreter that ends with a sequence terminating instruction.

It will be seen that each of the code fragments 26 of FIG. 2 is terminated by a sequence terminating instruction BXJ. The action of this sequence terminating instruction BXJ varies depending upon the state of the data processing system 2 as will be illustrated in FIG. 3. FIG. 3 is a flow diagram illustrating in a highly schematic form the processing performed by a code fragment 26 within the software instruction interpreter. At step 28, the operation specified by the Java bytecode being interpreted is performed. At step 30, the next Java bytecode to be executed is read from the bytecode stream 22 and the bytecode pointer within the Java bytecode stream 22 corresponding to this next Java bytecode is stored within a register of the register bank 8, namely R14. Thus, for the Java bytecode BC4 of FIG. 2, the next Java bytecode will be BC5 and register R14 will be loaded with a pointer to the memory location of the Java bytecode BC5.

At step 32, the pointer within the table of pointers 24 corresponding to the next Java bytecode BC5 is read from the table of pointers 24 and stored within a register of the register bank 8, namely register R12.

It will be appreciated that FIG. 3 illustrates the steps 28, 30 and 32 being performed separately and sequentially. However, in accordance with known programming techniques the processing of steps 30 and 32 may be conveniently interleaved within the processing of step 28 to take advantage of otherwise wasted processing opportunities (cycles) within the processing of step 28. Thus, the processing of steps 30 and 32 can be provided with relatively little execution speed overhead.

Step 34 executes the sequence terminating instruction BXJ with register R14 specified as an operand.

Prior to executing the BXJ instruction at step 34, the state of the system has been set up with the pointer to the next Java bytecode within the Java bytecode stream 22 being stored within register R14 and the pointer to the code fragment corresponding to that next Java bytecode being stored within the register R12. The choice of the particular registers could be varied and none, one or both specified as operands to the sequence terminating instruction or predetermined and defined by the architecture.

Steps 28, 30, 32 and 34 are predominantly software steps. The steps subsequent to step 34 in FIG. 3 are predominantly hardware steps and take place without separate identifiable program instructions. At step 36, the hardware detects whether or not the bytecode translation hardware 6 is active. It does this by reading the register flag values for the presence and the enablement of the bytecode translation hardware 6. Other mechanisms for determining the presence of active bytecode translation hardware 6 are also possible.

If bytecode translation hardware 6 is present and enabled, then processing proceeds to step 38 at which control is passed to the bytecode translation hardware 6 together with the contents of the register R14 specifying the bytecode pointer to a bytecode within the bytecode stream 22 which the bytecode translation hardware 6 should attempt to execute as its next bytecode. The action of the code fragment 26 illustrated then terminates.

Alternatively, if the determination at step 36 is that there is no bytecode translation hardware 6 or the bytecode translation hardware is disabled, then processing proceeds to step 40 at which a jump within the native ARM instruction code is made to commence execution of the code fragment within the software instruction interpreter that is pointed to by the address stored within register R12. Thus, rapid execution of the next code fragment is initiated yielding an advantage in processing speed.

Figures 4, 5:
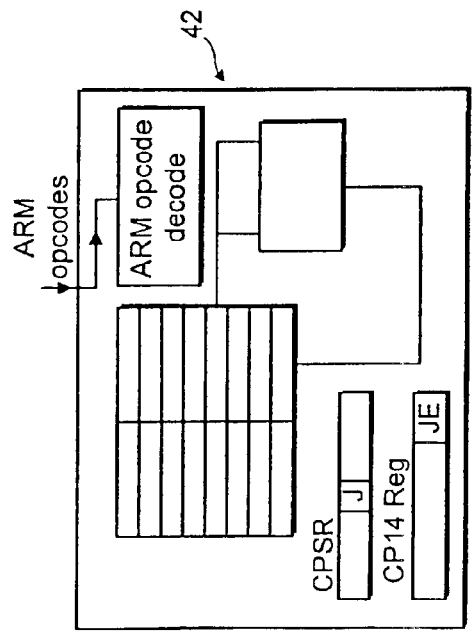
FIG. 4 is an example of a code fragment executed in place of a bytecode.
FIG. 5 illustrates an example data processing system that does not have hardware bytecode execution support.

FIG. 4 illustrates a particular code fragment in more detail. This particular example is an integer addition Java bytecode, whose mnemonic is iadd.

The first ARM native instruction uses the bytecode pointer in register R14 incremented by one to read the next bytecode value (an integer add instruction does not have any following bytecode operands and so the next bytecode will immediately follow the current bytecode). The bytecode pointer in register R14 is also updated with the incremented value.

The second and third instructions serve to retrieve from the stack the two integer operand values to be added.

The fourth instruction takes advantage of what would otherwise be a wasted processing cycle due to register interlocking on register RO to retrieve the address value of the code fragment for the next bytecode stored in register R4 and store this address within register R12. A register Rexc is used to store a base pointer to the start of the table of pointers 24.

The fifth instruction performs the integer add specified by the Java bytecode.

The sixth instruction stores the result of the Java bytecode back to the stack.

The final instruction is the sequence terminating instruction BXJ specified with the operand R12. The register R12 stores the address of the ARM code fragment that will be needed to software interpret the next Java bytecode should software interpretation be required. The execution of the BXJ instruction determines whether or not there is present enabled bytecode translation hardware 6. If this is present, then control passes to this bytecode translation hardware 6 together with the operand stored in register R14 specifying the next bytecode address. If active bytecode translation hardware 6 is not present, then execution of the code fragment for the next bytecode as pointed to by the address value within register R12 is started.

FIG. 5 schematically illustrates a data processing system 42 similar to that of FIG. 1 except that in this case no bytecode translation hardware 6 is provided. In this system flag 21 always indicates that ARM instructions are being executed and attempts to enter Java bytecode execution with a BXJ instruction are always treated as though the bytecode translation hardware 6 were disabled, with flag 20 being ignored.

Figure 6:
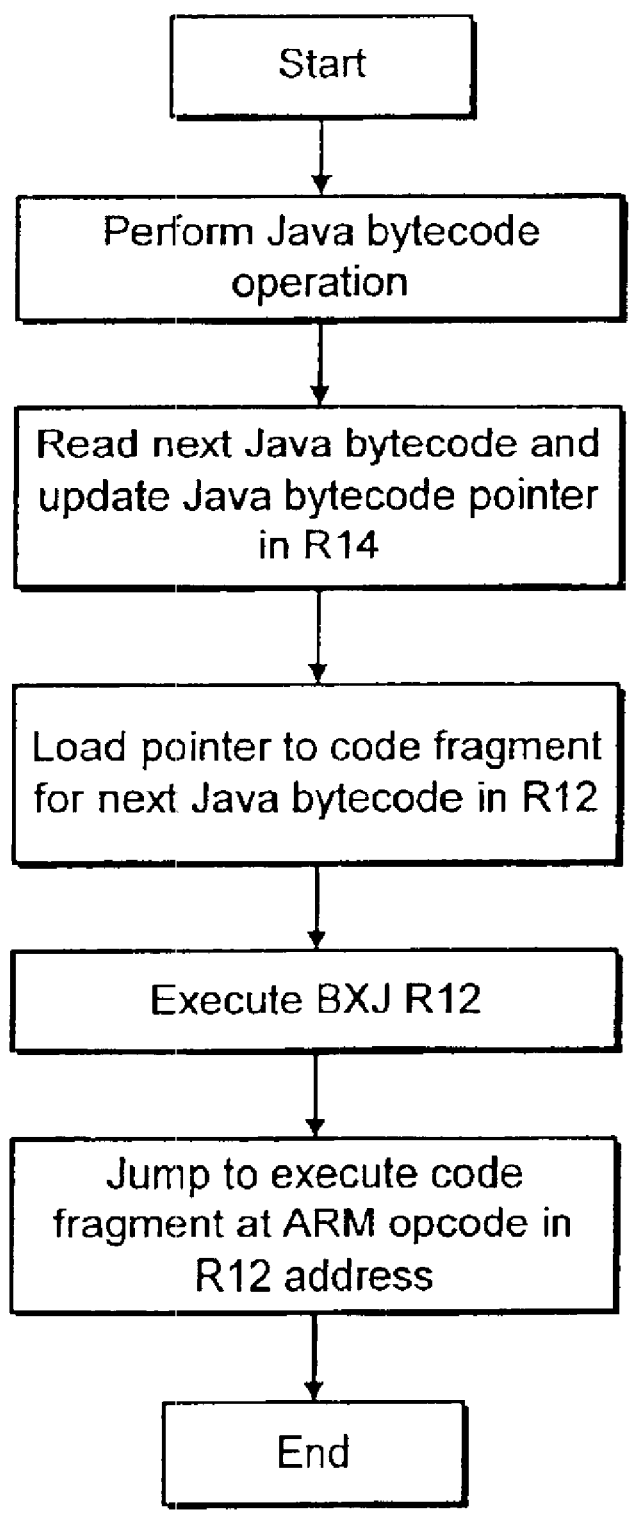
FIG. 6 is a flow diagram illustrating the software instruction interpreter action when operating with the system of FIG. 5.

FIG. 6 illustrates a flow diagram of the processing performed by the system 42 in executing a Java bytecode. This is similar to the processing of FIG. 3 in that the same software interpreter code is being used except that in this case when the sequence terminating instruction BXJ is executed, there is never the possibility of hardware bytecode support and accordingly processing always continues with a jump to execute the code fragment pointed to by R12 as being the code fragment for the next Java bytecode.

It will be appreciated that the software instruction interpreter in this case is provided as ARM native instructions. The software instruction interpreter (and other support code) may be provided as a separate computer program product in its own right. This computer program product may be distributed via a recording medium, such as a floppy disk or a CD or might be dynamically downloaded via a network link. In the context of embedded processing applications, to which the present invention is particularly well suited, the software instruction interpreter may provided as firmware within a read only memory or some other non-volatile program storage device within an embedded system.

FIG. 7 illustrates the relationship between Java bytecodes and the processing operations that they specify. As will be seen from FIG. 7, the 8-bit Java bytecodes provide 256 possible different bytecode values. The first 203 of these Java bytecodes are subject to fixed bindings as specified within the Java standard, to corresponding processing operations, such as iadd discussed previously. The last two Java bytecodes, namely 254 and 255, are described in The Java Virtual Machine Specification as being implementation defined. Therefore a Java implementation is fee to assign fixed bindings to these bytecodes. Alternatively a Java implementation may choose to treat these as having programmable bindings. Jazelle specifies fixed bindings for these bytecodes. Between bytecode values 203 and 253 inclusive, programmable bindings may be specified as desired by a user. These are typically used to provide bindings between bytecodes and processing operations, such as quick form bytecodes that are resolved during run time (see The Java Virtual Machine Specification, authors Tim Lindholm and Frank Yellin, publishers Addison Wesley, ISBN 0-201-63452-X).

It will be appreciated from FIG. 7 that whilst hardware accelerated interpretation techniques are well suited to dealing with the fixed bindings, these techniques are less well suited to dealing with the programmable bindings. Whilst it would be possible to treat all of the programmable bindings using software interpretation techniques, such as interpreting of the relevant bytecodes to be represented by corresponding code fragments, this would be slow for what in some cases can be performance critical bytecodes.

Figure 8:
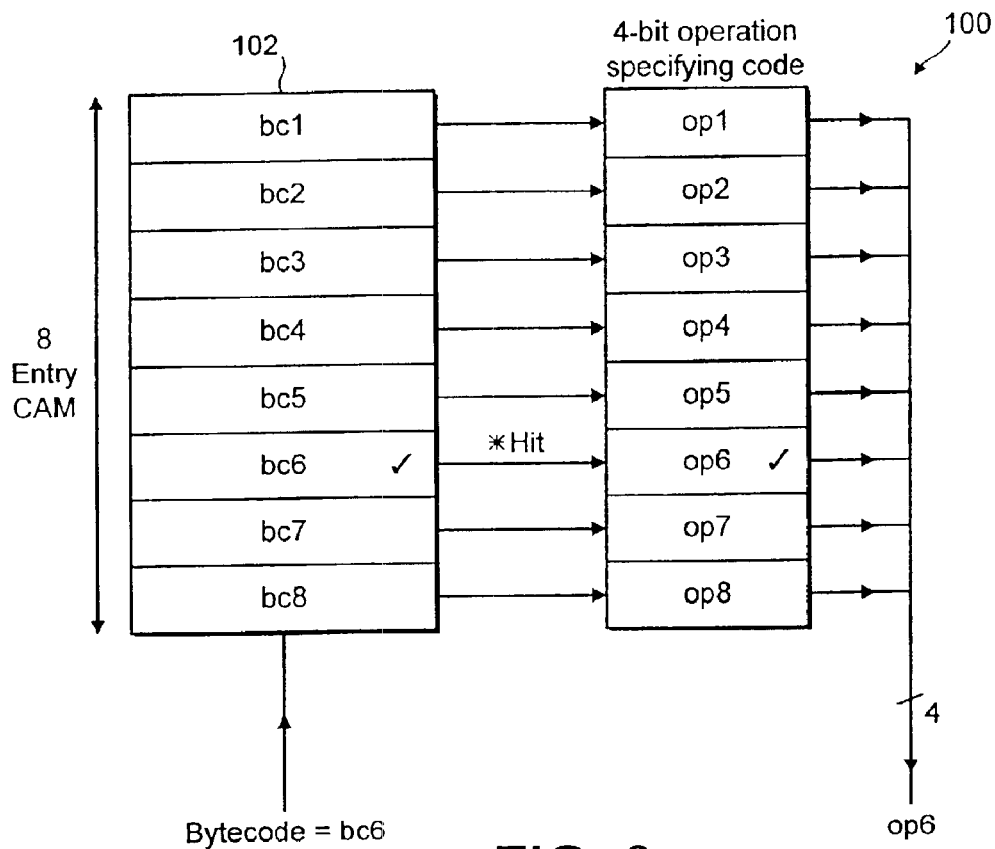
FIG. 8 illustrates a programmable translation table in the form of a content addressable memory.

FIG. 8 illustrates one form of programmable translation table. This programmable translation table 100 is in the form of a content addressable memory. A bytecode to be translated is input to a CAM lookup array 102. If this array 102 contains a matching bytecode entry, then a hit is generated that causes a corresponding operation specifying value to be output, i.e.

if there is a matching bytecode entry in the CAM table, then the hardware uses the operation specifying code to determine an operation to be performed in hardware, performs that operation and moves on to the next bytecode;

if there is not a matching bytecode entry in the CAM table, then the bytecode is treated as non-hardware supported and its code fragment is called.

In this example, the operation specifying values are 4-bit values and the CAM entry that has given rise to the hit corresponds to bytecode bc6. As will be understood from FIG. 7, all of the bytecodes that may be subject to such programmable translation have their most significant two bits as "1" and accordingly only the least significant 6 bits of the bytecode need be input to the array 102.

The programmable translation table 100 in this example has eight entries. The number of entries present may be varied depending upon the amount of hardware resources that it is desired to dedicate to this task. In some examples only four entries may be provided, whilst in other ten entries may be appropriate. It may also be possible to provide an entry for every possible programmable binding bytecode.

It will be appreciated that if the programmable mapping resources available are first filled with the most critical translation, then less critical translations may be subject to software interpretation. The provision of the software interpreter in combination with the programmable translation table allows the configuration of the system and the programming of the table to be made without it being necessary to know how many table entries are available since if the table overflows, then the required translations will be trapped and performed by the software interpreter.

Figure 9:
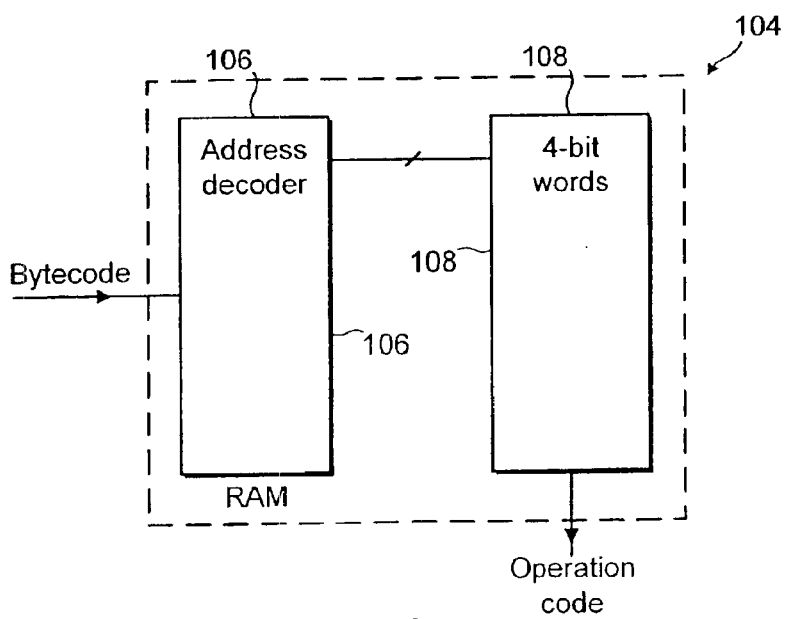
FIG. 9 illustrates a programmable translation table in the form of a random access memory.

FIG. 9 illustrates a second example programmable translation table 104. In this example the translation table is provided in the form of a random access memory with the bytecode to be translated to be input to a decoder 106 which treats the bytecode as an address to an RAM array 108 of 4-bit words each representing an operation specifying code. In this case an operation specifying code will always be found for the bytecode. As a result, this type of table uses one extra operation specifying code, which specifies "call the code fragment for this bytecode".

Figure 10:
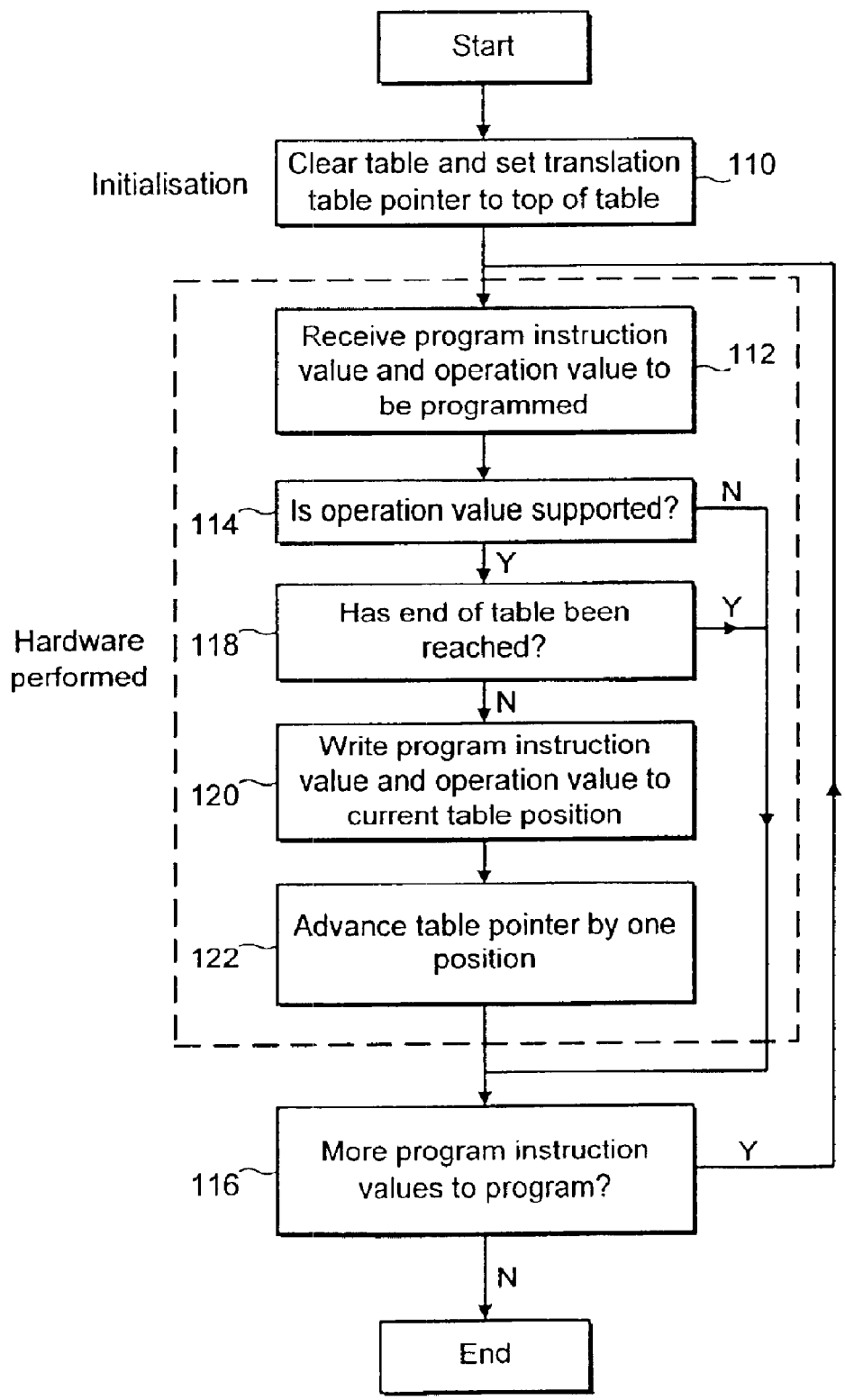
FIG. 10 is a flow diagram schematically illustrating the initialising and programming of a programmable translation table.

FIG. 10 is a schematic flow diagram illustrating the initialisation and configuration of a programmable mapping hardware interpreter having the form of the example of FIG. 8. In practice, different portions of the actions illustrated in this flow diagram are respectively performed by software initialisation instructions and the hardware responding to those instructions.

At step 110, a table initialisation instruction is executed that serves to clear all existing table entries and set a pointer to the top entry in the table. Subsequent to this, initialisation code may execute to load mappings into the translation table using program instructions such as coprocessor register loads. The different forms of these table loading instructions can vary depending upon the particular circumstances and environment. The programmable mapping hardware interpreter system responds to these instructions by receiving a program instruction value, such as a Java bytecode, and the operation value to be associated with this at step 112. At step 114, unsupported operation trap hardware checks that the operation value being programmed is one that is supported by that programmable mapping hardware interpreter. Different programmable mapping hardware interpreters may support different sets of operation values and so may be provided with their own specific trap hardware. The trap hardware can be relatively simple if a particular system for instance knows that it supports operation values 0,1,2,3,4, 5,6,7,8,10, but not 9. A hardware comparator at step 114 can compare the operation value for equality with a value of 9 and reject the programming by diverting processing to step 116 if a 9 detected.

Assuming that step 114 indicates that the operation value is supported, then step 118 checks to determine whether or not the end of the programmable mapping table has already been reached. If the programmable mapping table is already full, then processing again proceeds to step 116 without a new mapping being added. The provision of step 118 within the hardware means that the support code may seek to program the programmable mapping table without a knowledge of how many entries are available with the hardware merely rejecting overflowing entries. Thus, the programmer should place the most critical mappings at the start of the table programming to ensure that these take up slots that are available. The avoidance of the need for the support code to know how many programmable slots are available means that a single set of support code may operate upon multiple platforms.

Assuming the table has a vacant entry, then the new mapping is written into that entry at step 120 and the table pointer then advanced at step 122.

At step 116, the system tests for more program instruction values to be programmed into the programmable mapping table. Step 116 is typically a software step with the support code seeking to program as many mappings as it wishes during initialisation of the system.

In the case of initialising a RAM table as shown in FIG. 9, the process described above in relation to FIG. 10 may be followed subject to the following modifications:

that in step 110, the table is cleared by setting all table entries in array 108 of FIG. 9 to "call the bytecode fragment for this bytecode" rather than by setting the array 102 in FIG. 8 so that each entry does not match any bytecode;

that in step 110, there is no translation table pointer to be initialised;

that step 118 does not exist, because there is no translation table pointer;

that step 120 becomes "write operation value to table entry indicated by program instruction value"; and that step 122 does not exist, since there is no translation table pointer.

Figure 11:
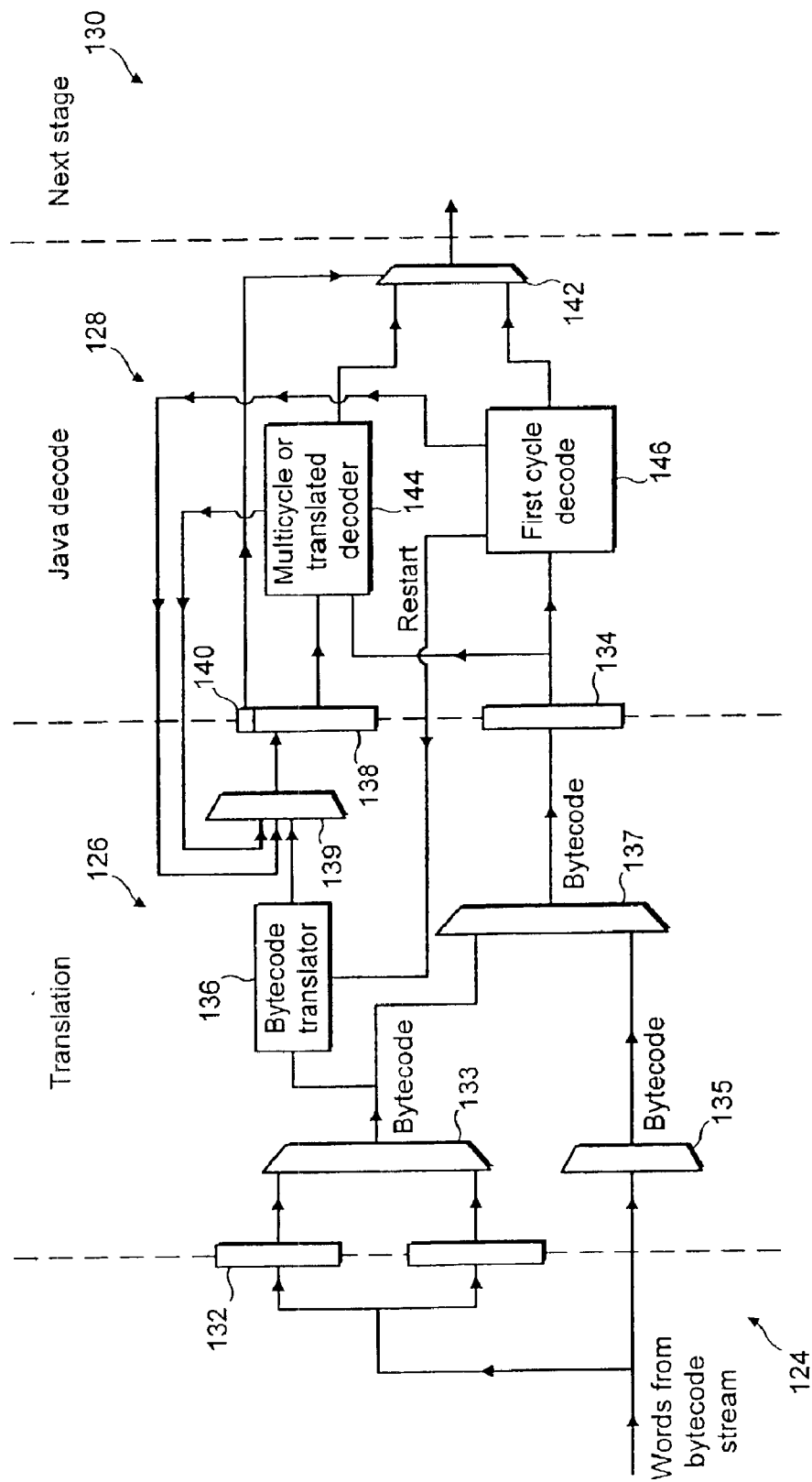
FIG. 11 is a diagram schematically illustrating a portion of the processing pipeline within a system that performs Java bytecode interpretation.

FIG. 11 illustrates a portion of a processing pipeline that may be used for Java bytecode interpretation. The processing pipeline 124 includes a translation stage 126 and a Java decode stage 128. A subsequent stage 130 could take a variety of different forms depending upon the particular implementation.

Words from the Java bytecode stream are loaded alternately into the two halves of the swing buffer 132. Normally, multiplexor 133 selects the current bytecode and its operands from swing buffer 132 and delivers it via multiplexor 137 to latch 134. If swing buffer 132 is empty because the pipeline has been flushed or for some other reason, then multiplexor 135 selects the correct bytecode directly from the incoming word of the Java bytecode stream and delivers it to latch 134.

The first cycle of decode for a bytecode is done by the first cycle decoder 146, acting on the bytecode in latch 134. In order to allow for cases where a hardware-supported bytecode has operands, further multiplexors select the operands from swing buffer 132 and deliver them to the first cycle decoder 146. These multiplexors are not shown in the figure, and are similar to multiplexors 133. Typically, the first cycle decoder 146 has more relaxed timing requirements for the operand inputs than for the bytecode input, so that a bypass path similar to that provided by multiplexors 135 and 137 and latch 134 is not required for the operands.

If the swing buffer 132 contains insufficient operand bytes for the bytecode in latch 134, then the first cycle decoder 146 stalls until sufficient operand bytes are available.

The output of the first cycle decoder 146 is an ARM instruction (or set of processor core controlling signals representing an ARM instruction) which is passed to the subsequent pipeline stage 130 via the multiplexor 142. A second output is an operation specifying code which is written to latch 138 via multiplexor 139. The operation specifying code contains a bit 140 which specifies whether this is a single-cycle bytecode.

On the next cycle, the following bytecode is decoded by the first cycle decoder 146 as previously described. If bit 140 indicates a single-cycle bytecode, then that bytecode is decoded and controls the subsequent pipeline stage 130 as previously described.

If bit 140 instead indicates a multicycle bytecode, then the first cycle decoder 146 is stalled and the multicycle or translated decoder 144 decodes the operation specifying code in latch 138 to produce an ARM instruction (or set of processor core controlling signals representing an ARM instruction), which the multiplexor 142 passes to the subsequent pipeline stage 130 instead of the corresponding output of the first cycle decoder 146. The multicycle or translated decoder also produces a further operation specifying code which is written to latch 138 via multiplexor 139, again instead of the corresponding output of the first cycle decoder 146. This further operation specifying code also contains a bit 140 which specifies whether this is the last ARM instruction to be produced for the multicycle bytecode. The multicycle or translated decoder 144 continues to be generate further ARM instructions as described above until bit 140 indicates that the last ARM instruction has been produced, and then the first cycle decoder 146 ceases to be stalled and produces the first ARM instruction for the following bytecode.

The process described above is modified in three ways when the bytecode in latch 134 needs to be translated. First, the bytecode is extracted from the swing buffer 132 by the multiplexor 133 and translated by the bytecode translator 136, producing an operation specifying code which is written to latch 138 via multiplexor 139. This operation specifying code has bit 140 set to indicate that the last ARM instruction has not been produced for the current bytecode, so that multiplexor 142 and multiplexor 139 will select the outputs of the multicycle or translated decoder 144 in place of those of the first cycle decoder 146 on the first cycle of the translated bytecode.

Secondly, the multicycle or translated decoder 144 generates all of the ARM instructions to be passed to the subsequent pipeline stage 130 and their corresponding further operation specifying codes to be written back into latch 138, rather than only generating those after the first cycle as it would for a bytecode that does not require translation.

Thirdly, if the bytecode was written directly to latch 134 via multiplexor 135 and so was not present in the swing buffer 132 and could not have been translated by the bytecode translator 136 on the previous cycle, then the first cycle decoder 146 signals the bytecode translator 136 that it must restart and stalls for a cycle. This ensures that when the first cycle decoder 146 ceases to stall, latch 138 holds a valid operation specifying code for the translated bytecode.

It will be seen from FIG. 11 that the provision of a translation pipeline stage enables the processing required by the programmable translation step to effectively be hidden or folded into the pipeline since the buffered instructions may be translated in advance and streamed into the rest of the pipeline as required.

It will be seen in FIG. 11 that in this example embodiment the fixed mapping hardware interpreter can be considered to be formed principally by the first cycle decoder 146 and the multicycle or translated decoder 144 operating in the mode in which it decodes multicycle bytecodes that have been subject to first cycle decoding by the first cycle decoder 146. The programmable mapping hardware interpreter in this example can be considered to be formed by the bytecode translator 136 and the multicycle or translated decoder 144 in this instance operating subsequent to translation of a programmable bytecode. The fixed mapping hardware interpreter and the programmable mapping hardware interpreter may be provided in a wide variety of different ways and may share significant common hardware whilst retaining their different functions from an abstract point of view. All these different possibilities are encompassed within the present described techniques.

Figures 12, 14:
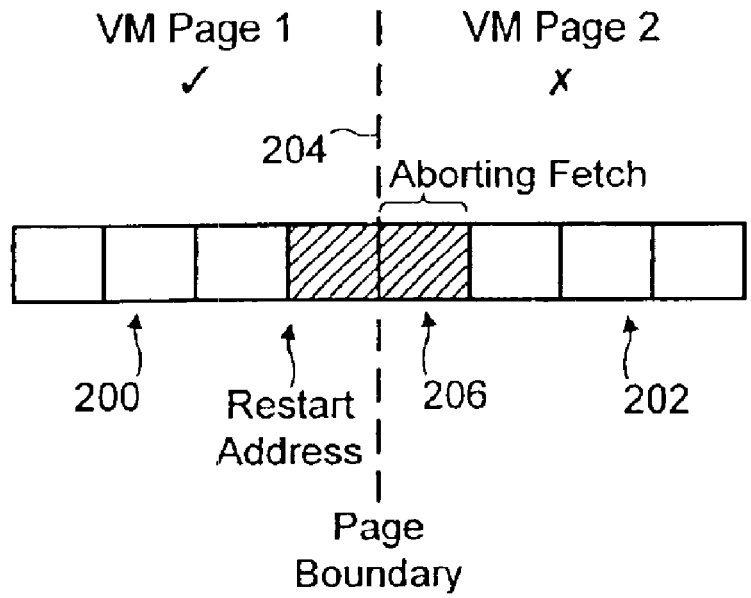
FIG. 12 schematically illustrates a variable length instruction spanning two instruction words and two virtual memory pages.
FIG. 14 gives a logical expression that is one way of specifying how a prefetch abort of the type illustrated in FIG. 12 may be detected.

FIG. 12 illustrates two 32-bit instruction words 200, 202 that span a virtual memory page boundary 204. This may be a 1 kB page boundary, although other page sizes are possible.

The first instruction word 200 is within a virtual memory page that is properly mapped within the virtual memory system. The second instruction word 202 lies within a virtual memory page that is not at this stage mapped within the virtual memory system. Accordingly, a two-byte variable length instruction 206 that has its first byte within the instruction word 200 and its second byte within the instruction word 202 will have a prefetch abort associated with its second byte. Conventional prefetch abort handling mechanisms that, for example, only support instruction word aligned instructions may not be able to deal with this situation and could, for example, seek to examine and repair the fetching of the instruction word 200 containing the first byte of the variable length instruction 206 rather than focusing on the instruction word 202 containing the second byte of that variable length instruction word 206 that actually led to the abort.

Figure 13:
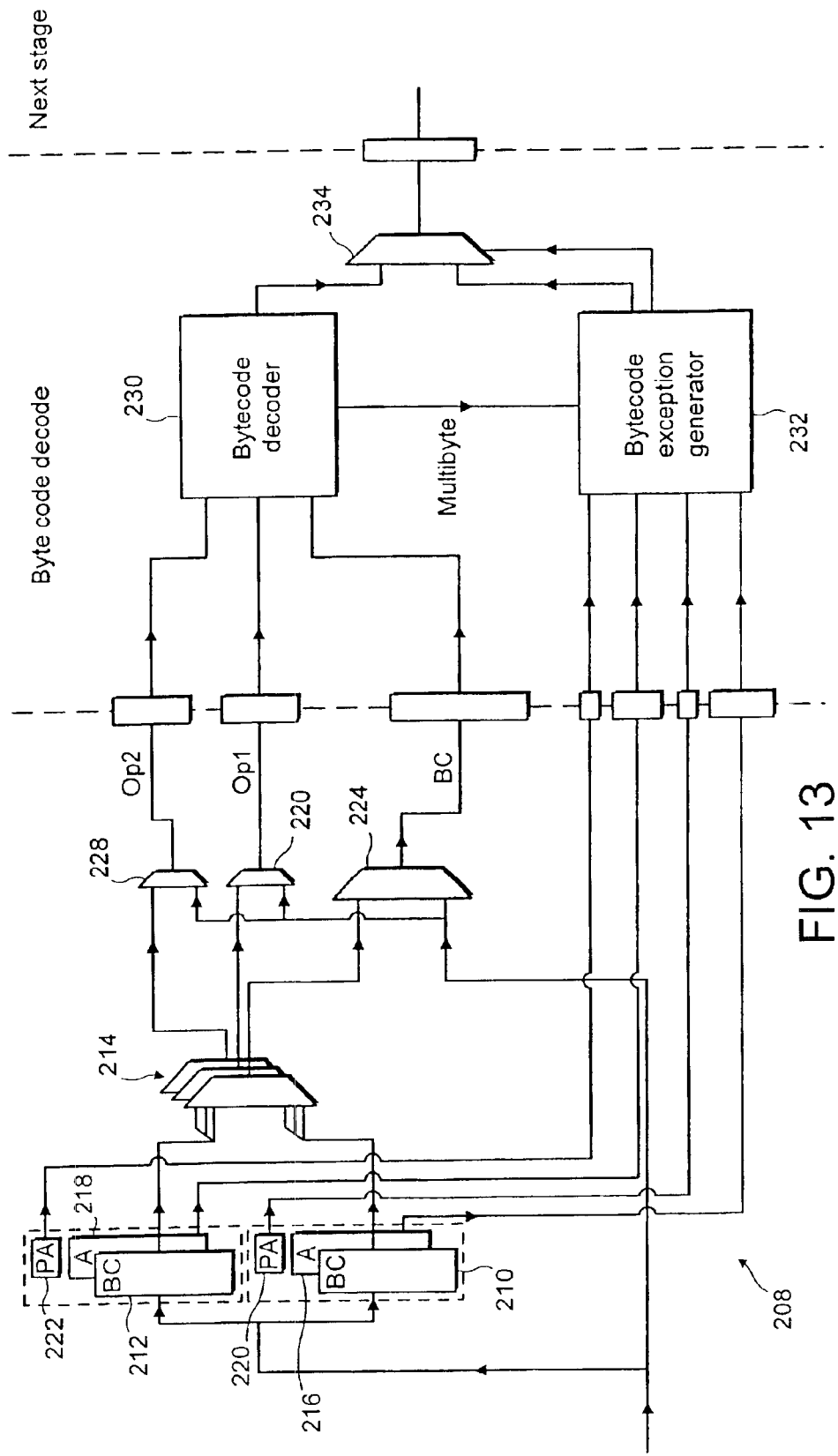
FIG. 13 schematically illustrates a portion of a data processing system pipeline including a mechanism for dealing with prefetch aborts of the type illustrated in FIG. 12.

FIG. 13 illustrates a part of an instruction pipeline 208 within a data processing system for processing Java bytecodes that includes a mechanism for dealing with prefetch aborts of the type illustrated in FIG. 12. An instruction buffer includes two instruction word registers 210 and 212 that each store a 32-bit instruction word. The Java bytecodes are each 8-bits in length, accompanied by zero or more operand values. A group of multiplexers 214 serve to select the appropriate bytes from within the instruction word registers 210 and 212 depending upon the current Java bytecode pointer position indicating the address of the first byte of the current Java bytecode instruction to be decoded.

Associated with each of the instruction word registers 210 and 212 are respective instruction address registers 216, 218 and prefetch abort flag registers 220 and 222. These associated registers respectively store the address of the instruction word to which they relate and whether or not a prefetch abort occurred when that instruction word was fetched from the memory system. This information is passed along the pipeline together with the instruction word itself as this information is typically needed further down the pipeline.

Multiplexers 224, 226 and 228 allow the input buffer arrangement to be bypassed if desired. This type of operation is discussed above. It will be appreciated that the instruction pipeline 208 does not, for the sake of clarity, show all of the features of the previously discussed instruction pipeline. Similarly, the previously discussed instruction pipeline does not show all of the features of the instruction pipeline 208. In practice a system may be provided with a combination of the features shown in the two illustrated instruction pipelines.

Within a bytecode decoding stage of the instruction pipeline 208, a bytecode decoder 230 is responsive to at least a Java bytecode from multiplexer 224, and optionally one or two operand bytes from multiplexers 226 and 228, to generate a mapped instruction(s) or corresponding control signals for passing to further stages in the pipeline to carry out processing corresponding to the decoded Java bytecode.

If a prefetch abort of the type illustrated in FIG. 12 has occurred, then whilst the Java bytecode itself may be valid, the operand values following it will not be valid and correct operation will not occur unless the prefetch abort is repaired. A bytecode exception generator 232 is responsive to the instruction word addresses from the registers 216 and 218 as well as the prefetch abort flags from the registers 220 and 222 to detect the occurrence of the type of situation illustrated in FIG. 12. If the bytecode exception generator 232 detects such a situation, then it forces a multiplexer 234 to issue an instruction or control signals to the subsequent stages as generated by the bytecode exception generator itself rather than as generated by the bytecode decoder 230. The bytecode exception generator 232 responds to the detection of the prefetch abort situation of FIG. 12 by triggering the execution of an ARM 32-bit code fragment emulating the Java bytecode being aborted rather than allowing the hardware to interpret that Java bytecode. Thus, the variable length Java instruction 206 that was subject to the prefetch abort will not itself be executed, but will instead be replaced by a sequence of 32-bit ARM instructions. The ARM instructions used to emulate the instruction are likely to be subject to data aborts when loading one or more of the operand bytes, with these data aborts occurring for the same reasons that prefetch aborts occurred when those bytes were originally fetched as part of the second instruction word 202, and it is also possible that further prefetch and data aborts will occur during execution of the ARM 32-bit code fragment. All of these aborts occur during ARM instruction execution and so will be handled correctly by existing abort exception handler routines.

In this way the prefetch abort that occurred upon fetching the bytecodes is suppressed (i.e. not passed through to the ARM core). Instead an ARM instruction sequence is executed and any aborts that occur with these ARM instructions will be dealt with using the existing mechanisms thus stepping over the bytecode that had a problem. After execution of the emulating ARM instructions used to replace the bytecode with an abort, execution of bytecodes may be resumed.

If the bytecode itself suffers a prefetch abort, then an ARM instruction marked with a prefetch abort is passed to the rest of the ARM pipeline. If and when it reaches the Execute stage of the pipeline, it will cause a prefetch abort exception to occur: this is a completely standard way of handling prefetch aborts on ARM instructions.

If the bytecode does not suffer a prefetch abort, but one or more of its operands do, as shown in FIG. 12, then the software code fragment for that bytecode is called. Any ARM instructions passed to the rest of the ARM pipeline to cause the code fragment to be called will not be marked with a prefetch abort, and so will execute normally if and when they reach the Execute stage of the pipeline.

FIG. 14 illustrates a logical expression of the type that may be used by the bytecode exception generator 232 to detect the type of situation illustrated in FIG. 12. Denote by "Half1" whichever half of the swing buffer in FIG. 13 (blocks 210, 216, 220 form one half, while blocks 212, 218, 222 form the other half, as denoted by the dashed lines around these elements in FIG. 13) currently holds the first instruction word (200 in FIG. 12), and by "Half2" the other half of the swing buffer, which holds the second instruction word (202 in FIG. 12). Let PA(Half1)mean the contents of whichever of blocks 220 and 222 is in Half1, and similarly for Half2.

Then the indicators of the situation described in FIG. 12 are that PA(Half1) is false, PA(Half2) is true, and the bytecode plus its operands span the boundary between the two swing buffer halves. (The fact that there is a page boundary marked there is simply because that is normally a requirement for it to be possible for the two PA( ) values to differ.)

In preferred designs such as ones where the swing buffer halves each store a word, and hardware-supported bytecodes are limited to a maximum of 2 operands, the formula for determining whether the bytecode plus its operands span the boundary is:

((number of operands=1) AND (bcaddr[1:0]=11))

OR ((number of operands=2) AND (bcaddr[1]=1))

where bcaddr is the address of the bytecode. This allows the logical expression shown in FIG. 14 to be derived.

Other techniques for identifying a prefetch abort may be used, such as a variable length instruction starting within a predetermined distance of a memory page boundary.

Figure 15:
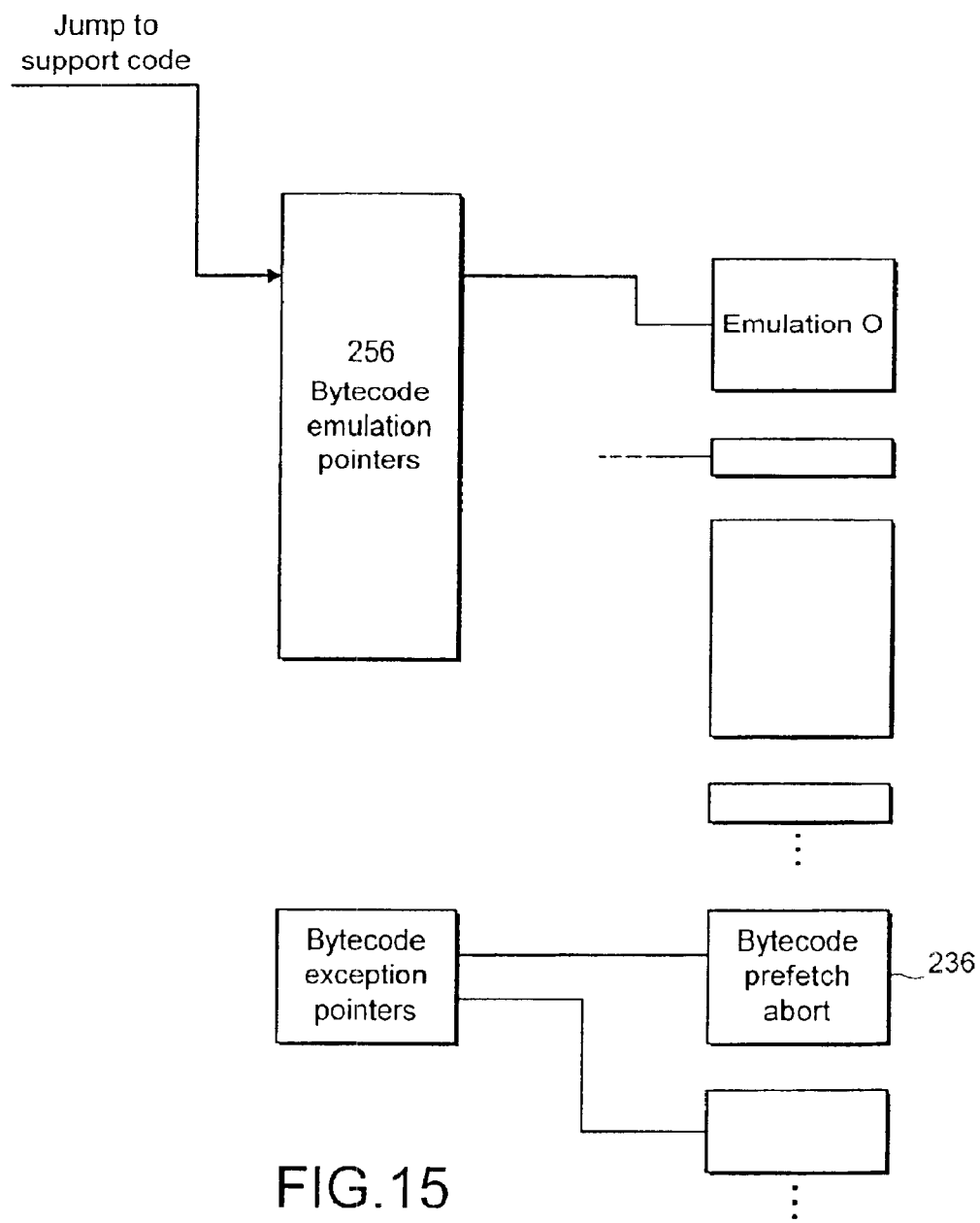
FIG. 15 schematically illustrates an arrangement of support code for abort handling and instruction emulation.

FIG. 15 schematically illustrates the structure of the support code associated with the Java bytecode interpretation. This is similar to the previously discussed figure, but in this case illustrates the inclusion of the pointers to bytecode exception handling code fragments that are triggered by bytecode exception events. Thus, each of the Java bytecodes has an associated ARM code fragment that emulates its operation. Furthermore, each of the bytecode exceptions that may occur has an associated portion of ARM exception handling code. In the case illustrated, a bytecode prefetch abort handling routine 236 is provided to be triggered upon detection of the above discussed type of prefetch abort by the bytecode exception generator 232. This abort handling code 236 acts by identifying the bytecode at the start of the variable length instruction that gave rise to its triggering, and then invoking the corresponding emulation code fragment for that bytecode within the collection of code fragments.

Figure 16:
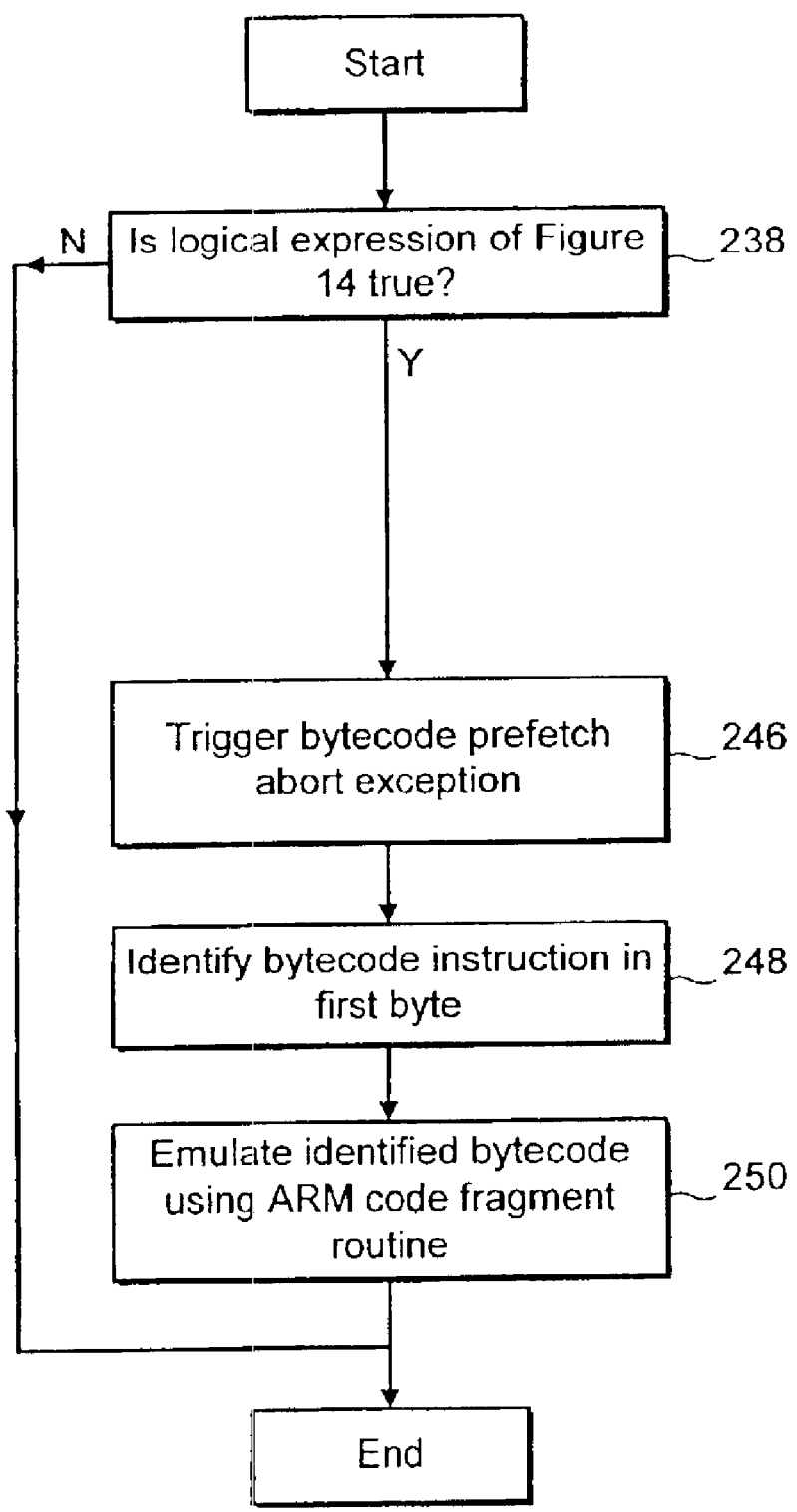
FIG. 16 is a flow diagram schematically illustrating the processing performed to deal with prefetch aborts of variable length byte code instructions.

FIG. 16 is a flow diagram schematically illustrating the operation of the bytecode exception generator 232 and the subsequent processing. Step 238 serves to determine whether or not the expression of FIG. 14 is true. If the expression is false then this process ends.

If step 238 has indicated the type of situation illustrated in FIG. 12, then step 246 is executed which triggers a bytecode prefetch abort exception to be initiated by the bytecode exception generator 232. The bytecode exception generator 232 may simply trigger execution of the ARM code bytecode prefetch abort handler 236. The abort handler 236 serves at step 248 to identify the bytecode which starts the variable length instruction and then at step 250 triggers execution of the code fragment of ARM instructions that emulate that identified bytecode.

The above described mechanism for dealing with prefetch aborts works well for situations in which there are four or fewer operands (i.e. five or fewer bytes in total), otherwise it would be possible for a bytecode and its operands to overflow the second buffer. In practice, the bytecodes for which it is preferred to provide a hardware acceleration mechanism all have 0, 1 or 2 operands with the remainder of bytecodes being handled in software in all cases, principally due to their complexity.

Figure 17:
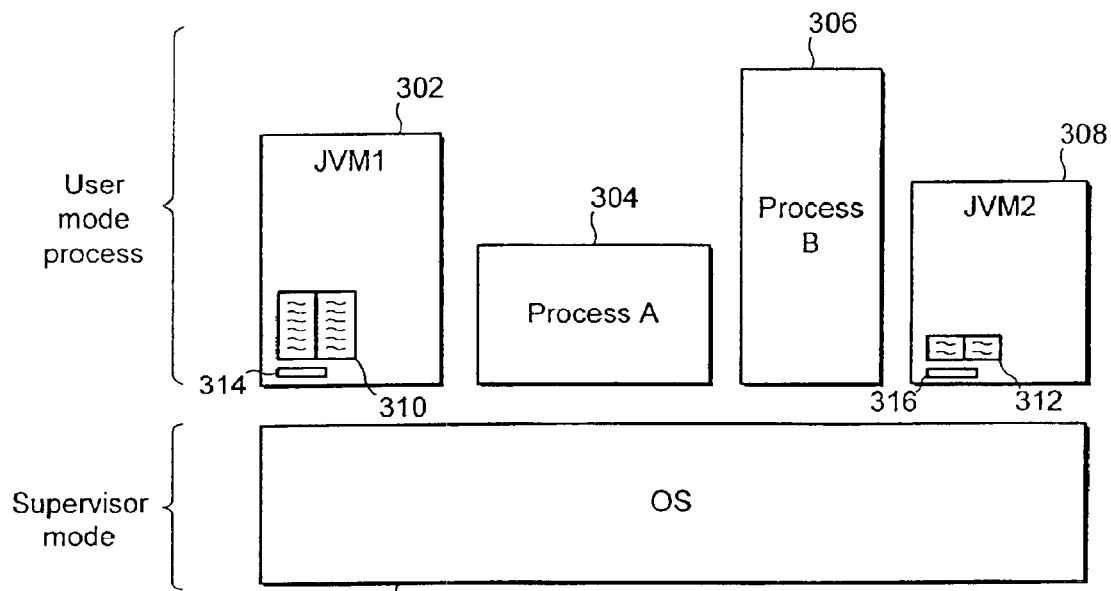
FIG. 17 illustrates the relationship between an operating system and various processes controlled by that operating system.

FIG. 17 illustrates an operating system 300 for controlling a plurality of user mode processes 302, 304, 306 and 308. The operating system 300 operates in a supervisor mode and the other processes 302, 304, 306 and 308 operate in a user mode having fewer access rights to configuration control parameters of the system than does the operating system 300 operating in supervisor mode.

As illustrated in FIG. 17 the processes 302 and 308 respectively relate to different Java Virtual Machines. Each of these Java Virtual Machines 302, 308 has its own configuration data formed of bytecode translation mapping data 310, 312 and configuration register data 314, 316. In practice, it will be appreciated that a single set of Java acceleration hardware is provided for executing both of the processes 302, 308, but when these different processes are using the Java acceleration hardware they each require it to be configured with their associated configuration data 310, 312, 314, 316. Thus, when the operating system 300 switches execution to a process using the Java acceleration hardware that is different from the previous process that used that hardware, then the Java acceleration hardware should be reinitialised and reconfigured. The operating system 300 does not do this re-initialisation and reconfiguration of the Java acceleration hardware itself, but indicates that it should be done by setting a configuration invalid indicator associated with the Java acceleration hardware to an invalid state.

Figure 18:
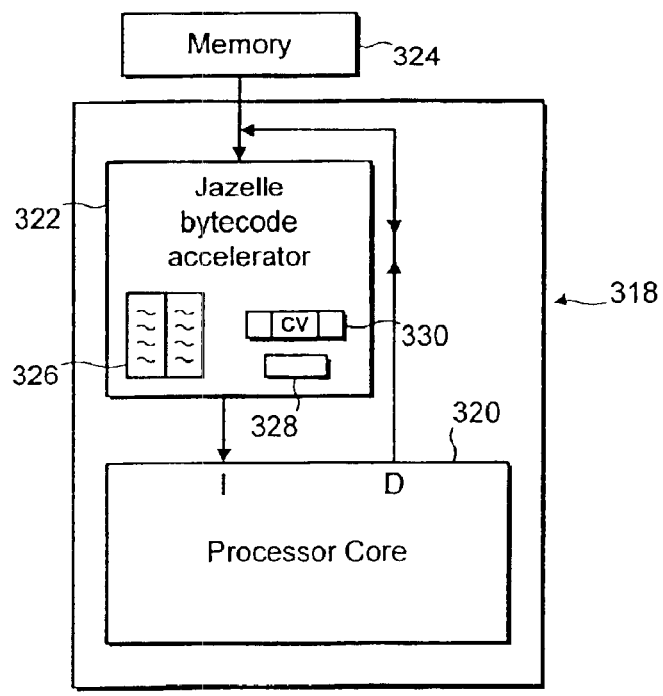
FIG. 18 illustrates a processing system including a processor core and a Java accelerator.

FIG. 18 schematically illustrates a data processing system 318 including a processor core 320 having a native instruction set (e.g. the ARM instruction set) and associated Java acceleration hardware 322. A memory 324 stores computer program code which may be in the form of ARM instructions or Java bytecodes. In the case of Java bytecodes, these are passed through the Java acceleration hardware 322 which serves to interpret them into a stream of ARM instructions (or control signals corresponding to ARM instructions) that may then be executed by the processor core 320. The Java acceleration hardware 322 includes a bytecode translation table 326 that requires programming for each Java Virtual Machine for which it is desired to execute Java bytecodes. Further a configuration data register 328 and an operating system control register 330 are provided within the Java acceleration hardware 322 to control its configuration. Included within the operating system control register 330 is a configuration valid indicator in the form of a flag CV that when set indicates that the configuration of the Java acceleration hardware 322 is valid and when unset that it is invalid.

The Java acceleration hardware 322 when it seeks to execute a Java bytecode is responsive to the configuration valid indicator to trigger a configuration invalid exception if the configuration valid indicator corresponds to the configuration data for the Java acceleration hardware 322 being in an invalid form. The configuration invalid exception handler can be an ARM code routine provided in a manner similar to that discussed above for the prefetch abort handler. A hardware mechanism is provided within the Java acceleration hardware 322 that sets the configuration valid indicator to the form indicating that the configuration data is valid as the configuration exception is triggered and before the new valid configuration data has actually been written into place. Whilst it may seem counter intuitive to set the configuration valid indicator in this way before the configuration data has actually been written, this approach has significant advantages in being able to avoid problems that can arise with process swaps part way through the setting of the configuration data. The configuration exception routine then sets up the required configuration data for the Java Virtual Machine to which it corresponds by writing the bytecode translation table entries as discussed previously and any other configuration data register values 328 as required. The configuration exception code must ensure that the writing of the configuration data is completed before any other tasks are undertaken by the Java acceleration hardware 322.

Figure 19:
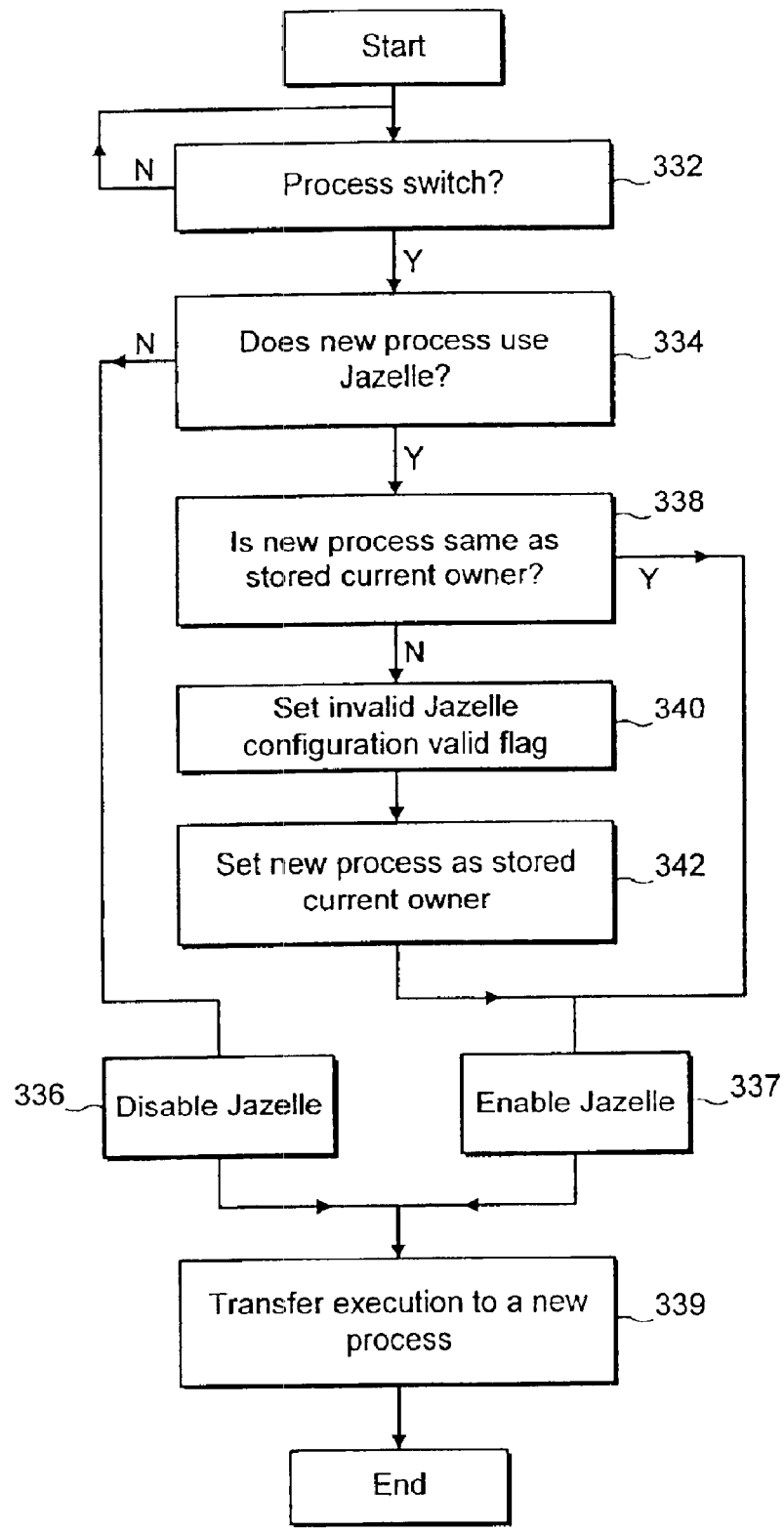
FIG. 19 is a flow diagram schematically illustrating the operations of an operating system in controlling the configuration of a Java accelerator.

FIG. 19 schematically illustrates the operation of the operating system 300. At step 332, the operating system waits to detect a process switch. When a process switch is detected, step 334 determines whether or not the new process is one that uses the Java acceleration hardware 322 (also, as previously mentioned, called Jazelle). If the Java acceleration hardware 322 is not used, then processing proceeds to step 336 at which the Java acceleration hardware 322 is disabled before proceeding to step 339 at which execution is transferred to the new process. If the Java acceleration hardware 322 is used, then processing proceeds to step 338 at which a determination is made as to whether or not the new process being invoked is the same as the stored current owner of the Java acceleration hardware 322 as recorded by the operating system 300. If the owner has not changed (i.e. the new process is in fact the same as the last process that used the Java acceleration hardware 322), then processing proceeds to step 337 at which the Java acceleration hardware 322 is enabled prior to proceeding to step 339. If the new process is not the stored current owner, then processing proceeds to step 340 at which the configuration valid indicator is set to indicate that the current configuration of the Java acceleration hardware 322 is not valid. This is the limit of the responsibility of the operating system 300 for managing this configuration change, the actual updating of the configuration data is left as a task to the Java acceleration hardware 322 itself operating with its own exception handling mechanisms.

After step 340, step 342 serves to update the stored current owner to be the new process before transfer of execution control is passed to step 337 and then step 339.

Figure 20:
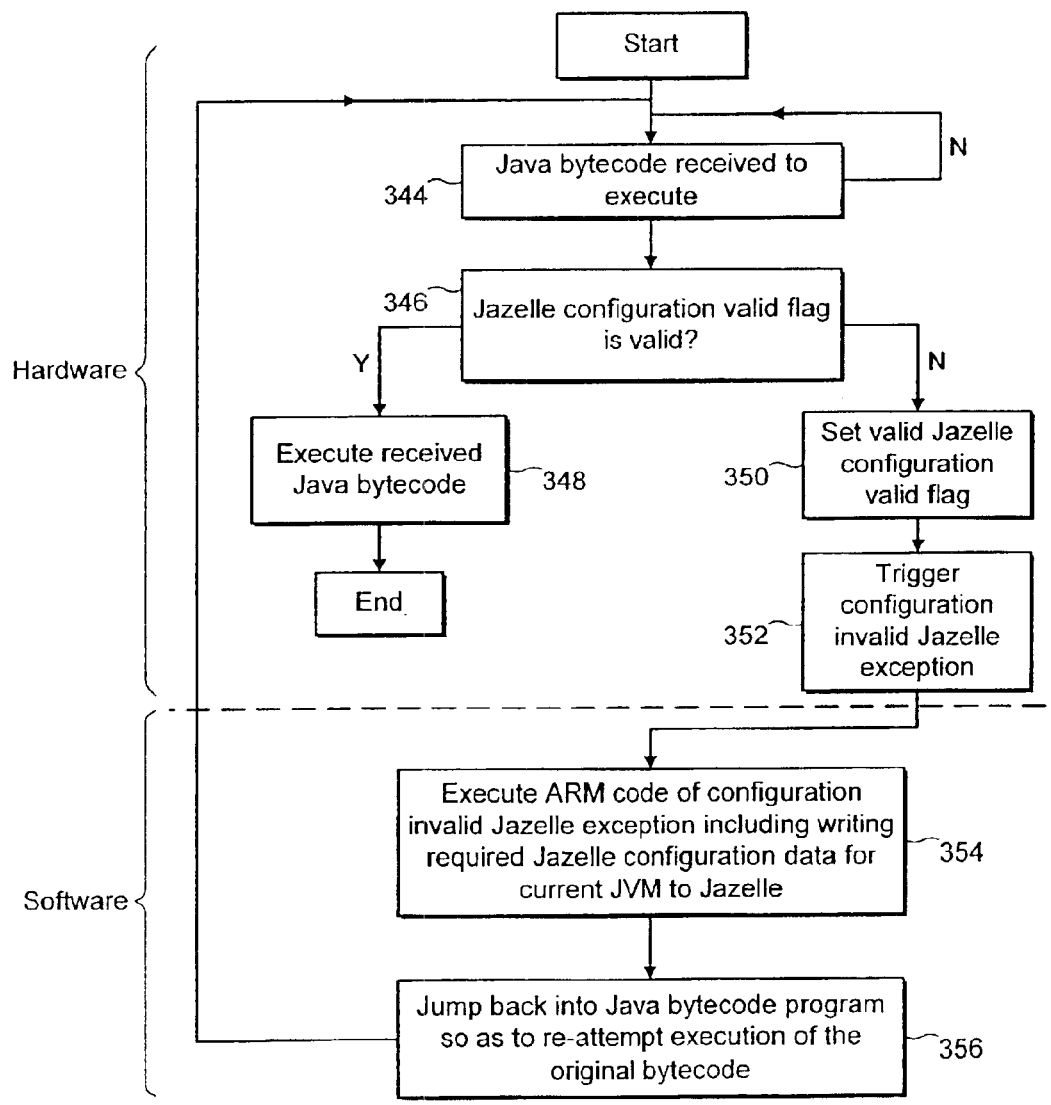
FIG. 20 is a flow diagram schematically illustrating the operation of a Java Virtual Machine in conjunction with a Java acceleration mechanism that it is using in controlling the configuration of the Java acceleration mechanism.

FIG. 20 illustrates the operations performed by the Java acceleration hardware 322. At step 344 the Java acceleration hardware 322 waits to receive a bytecode to execute. When a bytecode is received, the hardware checks that the configuration valid indicator shows that the configuration of the Java acceleration hardware 322 is valid using step 346. If the configuration is valid, then processing proceeds to step 348 at which the received bytecode is executed.

If the configuration is invalid, then processing proceeds to step 350 at which the Java acceleration hardware 322 uses a hardware mechanism to set the configuration valid indicator to show that the configuration is valid. This could also be done by a program instruction within the exception handler if desired. Step 352 serves to trigger a configuration invalid exception. The configuration invalid exception handler may be provided as a combination of a table of pointers to code fragments and appropriate code fragments for handling each of the exceptions concerned, such as software emulation of an instruction, a prefetch abort (both of which have been discussed above), as in this case, or a configuration exception.

Step 354 serves to execute the ARM code that makes up the configuration invalid exception and that serves to write the configuration data required to the Java acceleration hardware 322. This ARM code may take the form of a sequence of coprocessor register writes to populate the programmable translation table 326 as well as other configuration registers 330. After step 354, step 356 jumps back into the Java bytecode program so as to re-attempt execution of the original bytecode.

If a process switch occurs during step 354 or step 358, it is possible that the configuration set up so far will be made invalid by the other process and the configuration valid indicator cleared by the operating system. In the FIG. 20 procedure, this results in going around the 344-346-350-352-354-loop again, i.e. in reconfiguration being re-attempted from the start. When the bytecode does eventually actually get executed, the configuration is guaranteed to be valid.

FIG. 21 illustrates a data processing system as shown in FIG. 1 further incorporating a floating point subsystem. When an unhandled floating point operation occurs the floating point subsystem provides mechanisms to handle the unhandled floating point operation in ARM code.

An example of such a subsystem is the VFP software emulator system from ARM Limited of Cambridge, England. In the case of the VFP software emulator system all floating point operations are treated as unhandled floating point operations since there is no hardware available to perform the floating point operations. All floating point operations are therefore handled using the provided mechanisms to emulate the behaviour of the VFP in ARM code.

In the case of such systems unhandled floating point operations are precise, that is to say the point of detection of an unhandled floating point operation is the same as the point of occurance of the unhandled floating point operation.

FIG. 22 illustrates a data processing system as shown in FIGS. 1 and 21 further incorporating a floating point operation register and an unhandled operation state flag.

An example of such a subsystem is the VFP hardware system from ARM Limited of Cambridge, England. In the case of the VFP hardware system only certain types of floating point operation are treated as unhandled floating point operations, the remainder being handled by the VFP hardware.

The class of operations which may be subject to unhandled floating point operations include:
  division by zero
  operations involving a NaN
  operations involving an infinity
  operations involving denormalised numbers In the case of such systems unhandled floating point operation may be imprecise, that is to say the point of detection of an unhandled floating point operation is not necessarily the same as the point of occurance of the unhandled floating point operation.

An unhandled VFP operation occurs when the VFP coprocessor refuses to accept a VFP instruction that would normally form part of an ARM instruction stream but in the presence of a bytecode translator shown in FIG. 1 may be the result of a bytecode which has been translated into a combination of ARM and VFP instructions.

In the case that an unhandled VFP operation occurs as part of an ARM instruction stream, the ARM mechanism for handling the unhandled VFP operation is to generate an undefined instruction exception and execute the undefined instruction handler installed on the undefined instruction vector.

In the case of the VFP software emulator system all VFP operations are treated as unhandled VFP operations and the same ARM mechanism applies, an undefined instruction exception is generated and the undefined instruction handler is executed.

When the unhandled VFP operation occurs as part of the ARM instruction stream the undefined instruction handler can see by inspecting the instruction stream that the instruction which caused the unhandled VFP operation was indeed a VFP instruction, not some other kind of undefined instruction and as the undefined instruction handler executes in a priviledged mode it can issue the required coprocessor instructions to extract any internal state that it needs from the VFP coprocessor and complete the required instruction in software. The undefined instruction handler will use both the instruction identified in the ARM instruction stream and the internal state of the VFP to handle the unhandled operation.

On many VFP implementations, the instruction that caused the unhandled operation may not be the same as the instruction that was executing when the unhandled operation was detected. The unhandled operation may have been caused by an instruction that was issued earlier, executed in parallel with subsequent ARM instructions, but which encounters an unhandled condition. The VFP signals this by refusing to accept a following VFP instruction, forcing the VFP undefined-instruction handler to be entered which can interrogate the VFP to find the original cause of the unhandled operation.

When Jazelle is integrated into a system containing a VFP subsystem the following apply:

Java floating point instructions are translated by issuing the corresponding VFP instructions directly within the core using a set of signals having a direct correspondance to VFP instructions.

The VFP may signal an unhandled operation condition if it encounters an unhandled operation.

Jazelle intercepts the unhandled operation signal preventing it from being sent to the core and preventing the undefined instruction handler from executing as would happen if a VFP instruction in an ARM instruction stream signalled an incorrect operation. Instead Jazelle generates a Jazelle VFP exception which is handled by the Jazelle VM support code.

The VM support code, on encountering such a Jazelle VFP exception, should execute a VFP 'no-operation' instruction, ie. any VFP instruction which leaves the Jazelle state intact, such as an FMRX Rd, FPSCR instruction. This synchronises the VFP hardware with the support code and completes the operation of any VFP operation indicated by the floating point operation register in conjunction with the unhandled operation state flag which should be set in this case as an unhandled operation has just been encountered. Once the operation is complete the unhandled operation state flag will be cleared.

The approach exploits the fact that the instruction sequences issued by Jazelle are restartable as described in co-pending British Patent Application Number 0024402.0 filed on Oct. 5, 2000 which is incorporated herein in its entirety by reference. Use of the technique described in the above reference in conjunction with this technique allows the instruction which caused the generation of the VFP instruction which caused the unhandled operation to be restarted.

FIG. 23 illustrates for each of the Java floating point operations the corresponding VFP instructions which are issued by the Java bytecode translator. Note that only the VFP instruction which are issued are shown, the Java bytecode translator may issue additional ARM instruction(s) in conjunction with the VFP instructions. The Jazelle bytecode translator may also issue additional VFP loads and stores to load or store floating point values.

FIG. 24 illustrates a sequence of instructions or signals corresponding to instructions that might be issued by the Jazelle bytecode translator for the sequence of Java bytecodes consisting of a 'dmul' bytecode followed by a 'dcmpg' bytecode. The illustrated sequence would occur if a (dmul, dcmpg) bytecode sequence were to be executed at a time that the double-precision registers D0, D1, and D2 hold the third from top, second from top and top elements of the Java execution stack respectively, and that the integer result of the bytecode sequence is expected to be placed in the integer register R0.

Figure 29:
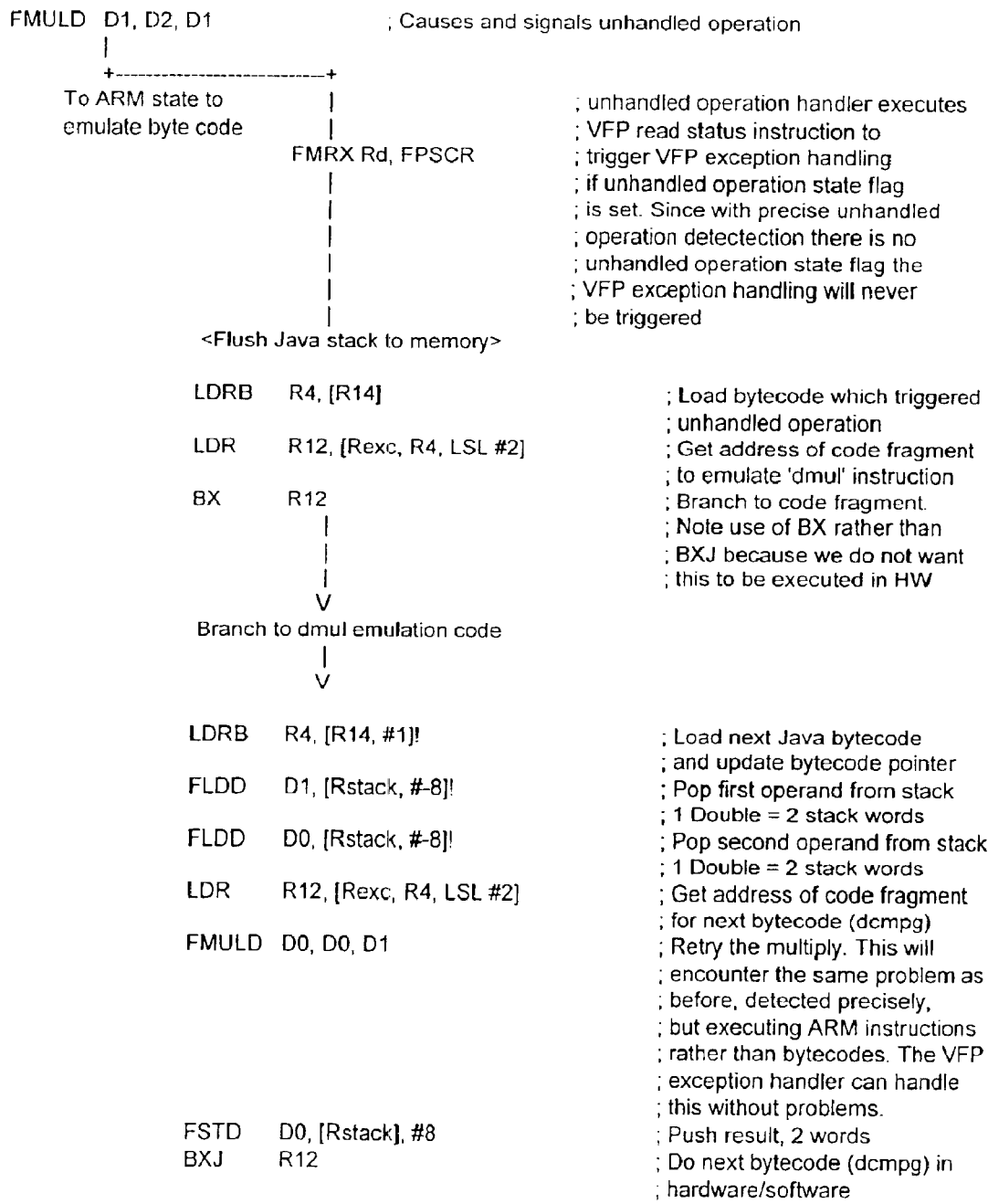
FIG. 29 shows the sequnce of operations when executing a 'dmul' instruction followed by a 'dcmpg' instruction where an unhandled floating point operation is caused by execution of the FMULD instruction generated by the Java acceleration hardware for the Java 'dmul' instruction, the sequence of operations shown is for a system using precise unhandled operation detection corresponding to FIG. 21.

FIGS. 25, 27, 29 and 30 illustrate the sequence of operations when an unhandled floating point operation occurs at various points in the translated instruction sequence. FIGS. 25 and 29 illustrate the sequence of operations when the unhandled floating point operation is caused by the FMULD instruction. FIGS. 27 and 30 illustrate the sequence of operations when the unhandled floating point operation is caused by the FCMPD instruction. FIGS. 25 and 27 illustrate the sequence of operations when the signalling of unhandled floating point operations is imprecise. FIGS. 29 and 30 illustrate the sequence of operations when the signalling of unhandled floating point operations is precise.

As can be seen there are four possible sequence of events:

1) FIG. 25: Imprecise unhandled operation detection, Java bytecode which signals the unhandled operation is not the same as that which caused the unhandled operation.

2) FIG. 27: Imprecise unhandled operation detection, Java bytecode which signals the unhandled operation is the same as that which caused it despite the fact the the system uses imprecise unhandled operation detection. This is because the second Java bytecode 'dcmpg' issues 2 VFP instructions for the one Java bytecode, the first of which causes the unhandled operation, the second of which signals it.

3) FIG. 29: Precise unhandled operation detection, Java bytecode which signals the unhandled operation is the same as that which caused it.

4) FIG. 30: Precise unhandled operation detction, Java bytecode which signals the unhandled operation is the same as that which caused it, however it is not known which of the two VFP instructions issued as a result of executing the 'dcmpg' bytecode actually caused and signalled the unhandled operation.

The combination of above mentioned restarting technique with this technique allows all these possible sequences of events to be handled correctly.

Figure 26:
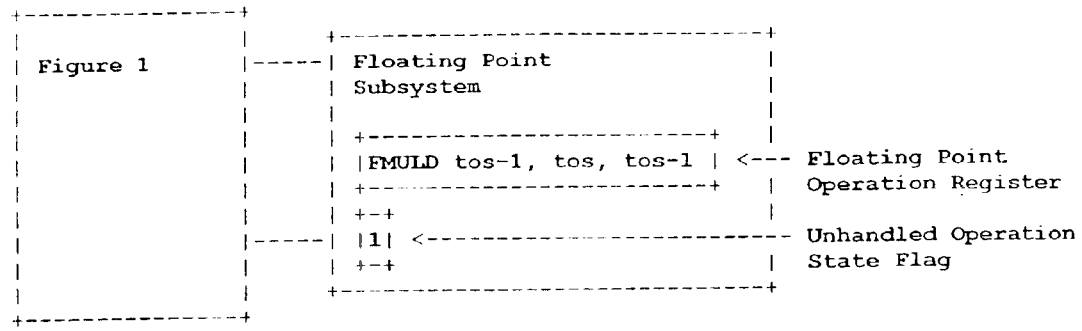
FIG. 26 shows the state of the Floating Point Operation Register and the Unhandled Operation State Flag after execution of the FMULD instruction in FIG. 25.
Figure 28:
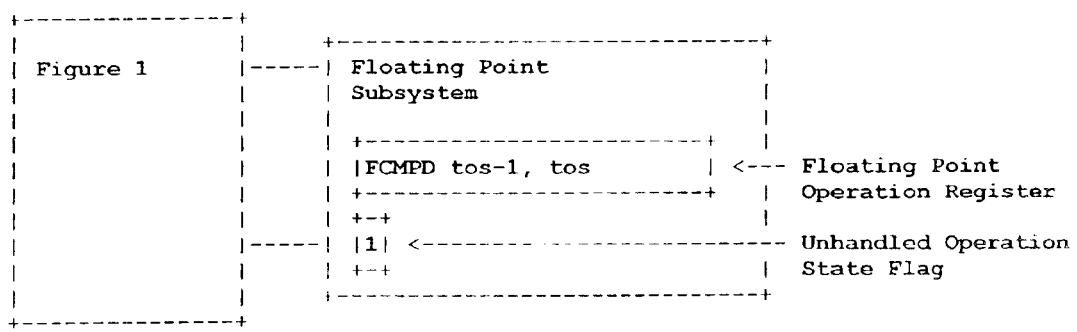
FIG. 28 shows the state of the Floating Point Operation Register and the Unhandled Operation State Flag after execution of the FCMPD instruction in FIG. 27.

FIGS. 26 and 28 illustrate the state of the floating point operation register and the unhandled operation state flag at the point immediately after the unhandled operation is caused corresponding to the sequence of operations illustrated in FIGS. 25 and 27 respectively.

Reference should be made to the co-pending British patent applications 0024399.8, 0024402.0, 0024404.6 and 0024396.4 all filed on Oct. 5, 2000, and British patent application 0028249.1 filed on Nov. 20, 2000 and U.S. patent application Ser. No. 09/731,060 filed on Dec. 7, 2000 which also describe a Java bytecode interpretation system. The disclosure of these co-pending applications is incorporated herein in its entirety by reference.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. Apparatus for processing data, said apparatus comprising:
   (i) a first execution mechanism operable to execute program instructions of a first instruction set; and
   (ii) a second execution mechanism operable to execute program instructions of a second instruction set, said second execution mechanism having variable configuration data associated therewith and a configuration valid indicator for indicating whether said variable configuration data associated with said second execution mechanism is valid;
   (iii) wherein a configuration invalid exception handler triggered by said second execution mechanism when said second execution mechanism attempts execution of a program instruction of said second instruction set whilst said configuration valid indicator indicates that said configuration data is invalid acts to change said configuration valid indicator to indicate that said configuration data is valid and to set said configuration data to a valid form.

2. Apparatus as claimed in claim 1, wherein an operating system executing upon said first execution mechanism, in response to detection of a change of process to a new process in at least those cases where said new process uses said second execution mechanism and is not a last process to have completely written its configuration data to said second execution mechanism, acts to set said configuration valid indicator to indicate that said configuration data is invalid.

3. Apparatus as claimed in claim 2, wherein said operating system executes in a supervisor mode and said configuration invalid exception handler executes using a user mode having fewer access rights than said supervisor mode.

4. Apparatus as claimed in claim 1, wherein said configuration invalid exception handler includes hardware within said second execution mechanism that serves to change said configuration valid indicator to indicate that said configuration data is valid.

5. Apparatus as claimed in claim 3, wherein said configuration valid indicator is not accessible in said user mode but is accessible in said supervisor mode.

6. Apparatus as claimed in claim 1, wherein said configuration invalid exception handler includes at least one program instruction of said first instruction set executed using said first execution mechanism that serves to change said configuration valid indicator to indicate that said configuration data is valid.

7. Apparatus as claimed in claim 1, wherein said configuration invalid exception handler includes at least one program instruction of said first instruction set executed using said first execution mechanism that serves to set said configuration data to said valid form.

8. Apparatus as claimed in claim 1, wherein said first execution mechanism comprises a processor core and said first instruction set comprises native instructions of said processor core.

9. Apparatus as claimed in claim 1, wherein said second execution mechanism includes a Java bytecode interpreter, said second instruction set being Java bytecodes.

10. Apparatus as claimed in claim 8, wherein said second execution mechanism further includes said processor core.

11. Apparatus as claimed in claim 1, wherein said configuration data for said second execution mechanism is configuration data relating to a particular Java Virtual Machine using said second execution mechanism.

12. Apparatus as claimed in claim 11, wherein said configuration data includes bytecode mapping data for mapping Java bytecodes to processing operations to be performed by said second execution mechanism.

13. Apparatus as claimed in claim 1, wherein said configuration valid indicator is set to indicate that said configuration data is invalid when said apparatus is reset.

14. Apparatus as claimed in claim 1, wherein said second execution mechanism includes an exception handling mechanism operable to handle a plurality of different types of exception that can occur when executing program instructions of said second instruction set, said configuration invalid exception handler being part of said exception handling mechanism.

15. A method of processing data, said method comprising the steps of:
(i) executing program instructions of a first instruction set using a first execution mechanism;
(ii) executing program instructions of a second instruction set using a second execution mechanism, said second execution mechanism having variable configuration data associated therewith and a configuration valid indicator for indicating whether said variable configuration data associated with said second execution mechanism is valid;
(iii) wherein when said second execution mechanism attempts execution of a program instruction of said second instruction set whilst said configuration valid indicator indicates that said configuration data is invalid, a configuration invalid exception handler triggered by said second execution mechanism acts to change said configuration valid indicator to indicate that said configuration data is valid and to set said configuration data to a valid form.

16. A method as claimed in claim 14, wherein an operating system executing upon said first execution mechanism, in response to detection of a change of process to a new process in at least those cases where said new process uses said second execution mechanism and is not a last process to have completely written its configuration data to said second execution mechanism, acts to set said configuration valid indicator to indicate that said configuration data is invalid.

17. A method as claimed in claim 16, wherein said operating system executes in a supervisor mode and said configuration invalid exception handler executes using a user mode having fewer access rights than said supervisor mode.

18. A method as claimed in claim 15, wherein said configuration invalid exception handler includes hardware within said second execution mechanism that serves to change said configuration valid indicator to indicate that said configuration data is valid.

19. A method as claimed in claim 17, wherein said configuration valid indicator is not accessible in said user mode but is accessible in said supervisor mode.

20. A method as claimed in claim 15, wherein said configuration invalid exception handler includes at least one program instruction of said first instruction set executed using said first execution mechanism that serves to change said configuration valid indicator to indicate that said configuration data is valid.

21. A method as claimed in claim 15, wherein said configuration invalid exception handler includes at least one program instruction of said first instruction set executed using said first execution mechanism that serves to set said configuration data to said valid form.

22. A method as claimed in claim 15, wherein said first execution mechanism comprises a processor core and said first instruction set comprises native instructions of said processor core.

23. A method as claimed in claim 15, wherein said second execution mechanism includes a Java bytecode interpreter, said second instruction set being Java bytecodes.

24. A method as claimed in claim 22, wherein said second execution mechanism further includes said processor core.

25. A method as claimed in claim 15, wherein said configuration data for said second execution mechanism is configuration data relating to a particular Java Virtual Machine using said second execution mechanism.

26. A method as claimed in claim 25, wherein said configuration data includes bytecode mapping data for mapping Java bytecodes to processing operations to be performed by said second execution mechanism.

27. A method as claimed in claim 15, wherein said configuration valid indicator is set to indicate that said configuration data is invalid upon a reset.

28. A method as claimed in claim 15, wherein said second execution mechanism includes an exception handling mechanism operable to handle a plurality of different types of exception that can occur when executing program instructions of said second instruction set, said configuration invalid exception handler being part of said exception handling mechanism.

29. A computer program product for controlling a data processing apparatus having a first execution mechanism operable to execute program instructions of a first instruction set and a second execution mechanism operable to execute program instructions of a second instruction set, said second execution mechanism having variable configuration data associated therewith and a configuration valid indicator for indicating whether said variable configuration data associated with said second execution mechanism is valid, said computer program product comprising:
(i) a configuration invalid exception handler triggered by said second execution mechanism when said second execution mechanism attempts execution of a program instruction of said second instruction set whilst said configuration valid indicator indicates that said configuration data is invalid to change said configuration valid indicator to indicate that said configuration data is valid and to set said configuration data to a valid form.

30. A computer program product as claimed in claim 28, wherein an operating system executing upon said first execution mechanism, in response to detection of a change of process to a new process in at least those cases where said new process uses said second execution mechanism and is not a last process to have completely written its configuration data to said second execution mechanism, acts to set said configuration valid indicator to indicate that said configuration data is invalid.

31. A computer program product as claimed in claim 30, wherein said operating system executes in a supervisor mode and said configuration invalid exception handler executes using a user mode having fewer access rights than said supervisor mode.

32. A computer program product as claimed claim 29, wherein said configuration invalid exception handler includes hardware within said second execution mechanism that serves to change said configuration valid indicator to indicate that said configuration data is valid.

33. A computer program product as claimed in claim 31, wherein said configuration valid indicator is not accessible in said user mode but is accessible in said supervisor mode.

34. A computer program product as claimed in claim 29, wherein said configuration invalid exception handler includes at least one program instruction of said first instruction set executed using said first execution mechanism that serves to change said configuration valid indicator to indicate that said configuration data is valid.

35. A computer program product as claimed in claim 29, wherein said configuration invalid exception handler includes at least one program instruction of said first instruction set executed using said first execution mechanism that serves to set said configuration data to said valid form.

36. A computer program product as claimed in claim 29, wherein said first execution mechanism comprises a processor core and said first instruction set comprises native instructions of said processor core.

37. A computer program product as claimed in claim 29, wherein said second execution mechanism includes a Java bytecode interpreter, said second instruction set being Java bytecodes.

38. A computer program product as claimed in claim 36, wherein said second execution mechanism further includes said processor core.

39. A computer program product as claimed in claim 29, wherein said configuration data for said second execution mechanism is configuration data relating to a particular Java Virtual Machine using said second execution mechanism.

40. A computer program product as claimed in claim 39, wherein said configuration data includes bytecode mapping data for mapping Java bytecodes to processing operations to be performed by said second execution mechanism.

41. A computer program product as claimed in claim 29, wherein said configuration valid indicator is set to indicate that said configuration data is invalid when said apparatus is reset.

42. A computer program product as claimed in claim 29, wherein said second execution mechanism includes an exception handling mechanism operable to handle a plurality of different types of exception that can occur when executing program instructions of said second instruction set, said configuration invalid exception handler being part of said exception handling mechanism.

* * * * *

UNITED STATES PATENT AND TRADEMARK OFFICE
CERTIFICATE OF CORRECTION

PATENT NO. : 6,907,515 B2
APPLICATION NO. : 10/152337
DATED : June 14, 2005
INVENTOR(S) : Seal et al.

It is certified that error appears in the above-identified patent and that said Letters Patent is hereby corrected as shown below:

Column 21, line 57 (claim 16, line 1), "14" should read --15--.

Column 23, line 1 (claim 30, line 1), "28" should read --29--.

Column 23, line 15 (claim 32, line 1), "claim 29" should read --in claim 29--.

Signed and Sealed this

Thirty-first Day of July, 2007

JON W. DUDAS
*Director of the United States Patent and Trademark Office*